United States Patent
Hoya

(10) Patent No.: US 7,747,549 B2
(45) Date of Patent: Jun. 29, 2010

(54) LONG-TERM MEMORY NEURAL NETWORK MODELING MEMORY-CHAINING FUNCTIONS OF THE BRAIN WHEREIN A POINTER HOLDS INFORMATION ABOUT MUTUALLY RELATED NEURONS AND NEURONS ARE CLASSIFIED HIERARCHICALLY BY DEGREE OF ACTIVATION

(75) Inventor: Tetsuya Hoya, Wako (JP)

(73) Assignee: Rikan, Saitama (JP)

( * ) Notice: Subject to any disclaimer, the term of this patent is extended or adjusted under 35 U.S.C. 154(b) by 629 days.

(21) Appl. No.: 10/253,642

(22) Filed: Sep. 25, 2002

(65) Prior Publication Data

US 2003/0115165 A1 Jun. 19, 2003

(30) Foreign Application Priority Data

Sep. 25, 2001 (JP) .............................. 2001-291235
Apr. 2, 2002 (JP) .............................. 2002-100223

(51) Int. Cl.
*G06F 15/18* (2006.01)
*G06N 3/04* (2006.01)

(52) U.S. Cl. .......................................... 706/16; 706/27
(58) Field of Classification Search .................... 706/16, 706/20, 25, 28, 30, 44
See application file for complete search history.

(56) References Cited

U.S. PATENT DOCUMENTS 5,335,291 A * 8/1994 Kramer et al. .............. 382/158
5,418,886 A * 5/1995 Oita et al. ..................... 706/25
5,659,666 A * 8/1997 Thaler .......................... 706/16
5,920,852 A * 7/1999 Graupe ......................... 706/26
5,995,644 A * 11/1999 Lai et al. .................... 382/131
6,175,772 B1 * 1/2001 Kamiya et al. ............... 700/31
6,219,657 B1 * 4/2001 Hatayama .................... 706/14

(Continued)

FOREIGN PATENT DOCUMENTS

JP 06-052141 A 2/1994

OTHER PUBLICATIONS

Wacquant et al. (Wacquant), Inward Relearning: A Step Towards Long-Term Memory, 1996.*

(Continued)

*Primary Examiner*—Donald Sparks
*Assistant Examiner*—Nathan H Brown, Jr.
(74) *Attorney, Agent, or Firm*—Birch, Stewart, Kolasch & Birch, LLP.

(57) ABSTRACT

A STM network 11 for temporarily storing input pattern vectors is formed in Phases 1 and 2, and then layered LTM networks 2 to L are formed successively by assigning output vectors provided by the STM network 11 as input vectors. In phase 4, a LTM network 1 for intuitive outputs to which input pattern vectors are applied directly is formed by taking the parameters of comparatively highly activated centroids among centroids in the LTM networks 2 to L. In phase 5, the parameters of the comparatively highly activated centroids among the centroids in the LTM networks 2 to L are fed back as the parameters of the centroids in the STM network. In phase 3, the LTM networks 2 to L are reconstructed at a particular time or in a fixed period by giving the centroid vectors of the LTM networks 2 to L again as input pattern vectors to the STM network 11.

15 Claims, 12 Drawing Sheets

U.S. PATENT DOCUMENTS 6,249,780 B1 * 6/2001 Mizokawa ............... 706/23
6,347,310 B1 * 2/2002 Passera ................. 706/25
6,446,056 B1 * 9/2002 Sadakuni ............... 706/14

OTHER PUBLICATIONS

Chambers et al., "Heuristic Pattern Correction Scheme Using Adaptively Trained Generalized Regression Neural Networks", 2001.*

Donald F. Specht; IEEE Transactions of Neural Networks, vol. 2, No. 6, Nov. 1991, pp. 568-576.

Tetsuya Hoya et al.; IEEE Transactions of Neural Networks, vol. 12, No. 1, Jan. 2001, pp. 91-100.

Donald F. Specht; Neural Networks, vol. 3, pp. 109-118, 1990, pp. 109-118.

Hoshino, et al.; "On Multilayer RBF Networks and a Novel Pyramid Network"; pp. 31-37.

* cited by examiner

LONG-TERM MEMORY NEURAL NETWORK MODELING MEMORY-CHAINING FUNCTIONS OF THE BRAIN WHEREIN A POINTER HOLDS INFORMATION ABOUT MUTUALLY RELATED NEURONS AND NEURONS ARE CLASSIFIED HIERARCHICALLY BY DEGREE OF ACTIVATION

BACKGROUND OF THE INVENTION

1. Field of the Invention

The present invention relates to modeling of functions relating to psychological activities of the brain. More particularly, the present invention relates to a memory system using an artificial neural network structure (neural network model) for modeling such psychological functions of the brain as 'intuition', 'consciousness or awareness', 'memory-chaining' and 'emotion expression'. The present invention is applicable to many fields including those of (1) systems of intelligent robotics; (2) pattern recognition systems such as security systems for fingerprint identification, speech recognition and digit/character voice recognition, and image diagnosis; and (3) general domestic electrical appliances.

2. Description of the Related Art

Interpretation of notions of the emotional and psychological activities of the actual brain is a really challenging problem. Many schools in various disciplines including biology and philosophy have historically developed arguments about the interpretation of functions of the brain relating to emotional and psychological activities among those of the brain. Recently, research and development activities have been made on the basis of information obtained by the progress of biological studies in addition to the advancement of computer technology to develop what is called "brain-style computers".

It is said that the elucidation of the notion of 'intuition' in terms of artificial neural networks is one of key approaches to the development of brain-style computers (Ref. [1]).

On the other hand, various arguments have been made in recent years in the field of robotics about the concrete modeling of the notion of 'consciousness' (Refs. [2] to [5]). An intelligent robot is proposed in Ref. [5] as an example of such modeling. This artificial robot is capable of imitating the behavior of an actual animal by using a model of 'consciousness'. A virtual machine modeling the behavior of 'consciousness' is proposed in Ref. [2].

However, concrete methods of modeling the notion of 'intuition' have not been established in the conventional neural networks, and any method capable of clearly explaining the modeling of the state of 'consciousness or awareness' has not been available.

SUMMARY OF THE INVENTION

The present invention has been made under the foregoing circumstances and it is therefore an object of the present invention to provide a memory system adapted to embody the states of 'intuition' and 'awareness', which are psychological functions of the brain, by using a comparatively simple artificial neural network structure, a method of forming the artificial neural network structure, and a program product of carrying out the method.

Another object of the present invention is to provide a memory system ('memory-chaining' system) adapted to realize 'memory-chaining' and 'emotion expression' by using a comparatively simple artificial neural network structure, a memory-chaining program product, and a neuron element for use in the memory chaining system. In this specification, the term 'memory-chaining' signifies an act of chaining information or processes held for long-term memory, and, psychologically, corresponds to memory called episodic memory, declarative memory or procedural memory (Ref. [9]).

<Prerequisites for Present Invention>

The present invention proposes, as a basis for modeling the psychological functions of the brain, a hierarchically arranged generalized regression neural network (HA-GRNN) including a hierarchical memory system provided with two memory models, a short-term memory (STM) model and a long-term memory (LTM) model, and interprets and embodies 'intuition', the state of 'awareness', 'memory-chaining' and 'emotion expression' in terms of the evolution of the HA-GRNN.

A generalized regression neural network (GRNN) (Ref. [6]), a prerequisite for the HA-GRNN, is one of theories of artificial neural networks in existence today and falls in the category of radial-basis function neural networks (RBF-NNs) (Ref. [7]). However, the GRNN, unlike ordinary RBF-NNs, has a special property that the weight vectors between radial-basis functions (RBFS) and output neurons are given identical with target vectors. By virtue of this attractive property, a dynamic neural system can be modeled without requiring any complex mathematical operations. A two-stage memory system, which incorporates the biologically motivated concept of both STM and LTM models, is proposed by way of example in Ref. [8]. This two-stage memory system is incorporated into a GRNN pattern classifying system for the on-line batch pattern correction of both digit voice recognition and digit character recognition tasks.

RBF-NNs have been often referred to as Gaussian mixture model (GMM) (Ref. [10]). RBF-NNs even can be subsumed into the concept of a support vector machine (SVM) (Ref. [11]) by regarding the RBF as a Gaussian kernel machine. So far, these concepts have been successfully applied to a wide variety of signal processing-related problems, such as pattern classification, signal modeling and prediction (Ref. [12]) or adaptive control (Ref. [6]).

The present invention has been made on those premises. According to a first aspect of the present invention, a memory system adapted to model psychological functions of a brain by using an artificial neural network structure includes: a short-term memory neural network unit that temporarily stores input pattern vectors; and a long-term memory neural network unit formed on the basis of output vectors provided by the short-term memory neural network unit; wherein the long-term memory neural network unit includes hierarchical neural networks for ordinary outputs, formed by using the output vectors of the short-term memory neural network unit.

In the memory system in the first aspect of the present invention, it is preferable that the long-term memory neural network unit includes a neural network for intuitive outputs, formed by using a parameter of a comparatively highly activated neuron among all the neurons in the neural networks for ordinary outputs, the neural network for intuitive outputs directly receiving input pattern vectors.

In the memory system in the first aspect of the present invention, it is preferable that the short-term memory neural network unit includes a neural network formed on the basis of input pattern vectors, the neural network including a neuron having a parameter that is set by using a parameter of a comparatively highly activated neuron among all neurons in the neural networks for ordinary outputs of the long-term memory neural network unit.

In the memory system in the first aspect of the present invention, it is preferable that each of the neural networks for ordinary outputs of the long-term memory neural network unit is a generalized regression neural network having a plurality of radial-basis functions as neurons thereof.

According to a second aspect of the present invention, a method of forming an artificial neural network structure modeling psychological functions of a brain, includes the steps of: forming a short-term memory neural network for temporarily storing input pattern vectors; forming a long-term memory neural network for ordinary outputs on the basis of output vectors provided by the short-term memory neural network; and successively forming hierarchical long-term memory neural networks for ordinary outputs by using parameters of neurons in the long-term memory neural network for ordinary outputs.

In the method according to the second aspect of the present invention, it is preferable that each of the long-term memory neural networks for ordinary outputs is a generalized regression neural network having a plurality of radial-basis functions as neurons thereof.

Preferably, the method according to the second aspect of the present invention further includes the step of forming a long-term memory neural network for intuitive outputs that directly receives input pattern vectors, by using a parameter of a comparatively highly activated neuron among all the neurons of the long-term memory neural networks for ordinary outputs.

Preferably, the method according to the second aspect of the present invention further includes the step of feeding back a parameter of a comparatively highly activated neuron among all the neurons of the long-term memory neural networks for ordinary outputs, as a parameter of a neuron of the formed short-term memory neural network.

Preferably, the method according to the second aspect of the present invention further includes the step of reconstructing the long-term memory neural networks for ordinary outputs at a predetermined time.

In the method according to the second aspect of the present invention, it is preferable that the long-term memory neural networks for ordinary outputs are reconstructed by giving parameters of the neurons of the long-term memory neural networks for ordinary outputs as input pattern vectors to the short-term memory neural network.

A program product according to a third aspect of the present invention is adapted to make a computer perform the foregoing method according to the second aspect of the present invention.

According to the first to third aspects of the present invention, a short-term memory neural network for temporarily storing input pattern vectors is formed, and the hierarchical long-term memory neural networks for ordinary outputs are formed successively by assigning the output vectors provided by the short-term memory neural network as input vectors. Therefore, the long-term memory neural network system is able to clearly and easily realize a hierarchical classifying system based on the 'importance', 'attractiveness' or the like of information. Thus, high generalization performance for given tasks can be realized.

According to the first to third aspects of the present invention, a generalized regression neural network (GRNN) having a plurality of radial-basis functions as neurons is used as the long-term memory neural network for ordinary outputs. Therefore, iterative learning of weight vectors is not necessary at all; and a network can be flexibly formed for given tasks.

According to the first to third aspects of the present invention, the long-term memory neural network for intuitive outputs that directly receives input pattern vectors is formed by using the parameters of comparatively highly activated neurons among all the neurons of the long-term memory neural networks for ordinary outputs. Therefore, the modeling of 'intuition', one of the psychological functions of the brain, can be achieved by making the entire network learn such that some neurons of the long-term memory neural network for intuitive outputs provide 'intuitive' outputs for a specific input pattern.

According to the first to third aspects of the present invention, the parameters of comparatively highly activated neurons among all the neurons of the long-term memory neural networks for ordinary outputs are fed back as the parameters of the neurons of the short-term memory neural network. Therefore, the highly activated neurons among all the neurons of the long-term memory neural networks for ordinary outputs exercise strong effect in the short-term memory neural network that receives the input pattern vector first, and thereby the modeling of the state of 'awareness', one of the psychological functions of the brain, can be realized.

According to the first to third aspects of the present invention, the long-term memory neural networks for ordinary outputs are reconstructed at a predetermined time. Therefore, the generalization performance of the entire network can be further enhanced. Since the long-term memory neural networks for ordinary outputs are reconstructed by reentering the parameters of the neurons of the long-term memory neural networks for ordinary outputs as input pattern vectors for the short-term memory neural network, a procedure for the reconstruction can be efficiently carried out According to a fourth aspect of the present invention, a memory-chaining system having an artificial neural network structure modeling the memory-chaining functions of a brain, includes: a long-term memory network unit using an artificial neural network structure including a plurality of neurons; and a network control unit that connects the neurons of the long-term memory network unit with each other to realize a memory-chaining function; wherein each of the neurons of the long-term memory network unit has a radial-basis function main part that provides an activation intensity corresponding to similarity between an input vector and a centroid vector according to a radial-basis function; and a pointer part that holds pointer information about a mutually related other neuron.

In the memory-chaining system according to the fourth aspect of the present invention, it is preferable that the neurons of the long-term memory network unit are classified hierarchically by activation degree. It is also preferable that the long-term memory network unit includes a neuron map part formed by assigning the plurality of neurons to different areas according to types of input vectors relevant to the neurons; an input area selector that selects an area relevant to an input vector from the plurality of areas included in the neuron map part; and an output area selector that selects an area to be outputted, from the plurality of areas included in the neuron map part.

In the memory-chaining system according to the fourth aspect of the present invention, it is preferable that the network control unit sets pointer information in a pointer part of each neuron on the basis of order of neurons added or activated in a time series in connection with a plurality of input vectors given to the long-term memory network unit.

In the memory-chaining system according to the fourth aspect of the present invention, it is preferable that the network control unit stores order of chaining of a plurality of mutually related neurons in a chaining order buffer memory, while sequentially following the plurality of mutually related neurons by using the pointer part of each neuron of the long-term memory network unit. It is also preferable that the network control unit causes the long-term memory network unit to multiply the outputs of the neurons respectively by different weighting coefficients when a plurality of mutually related neurons are followed sequentially by using the pointer part of each neuron of the long-term memory network unit.

Preferably, the memory-chaining system according to the fourth aspect of the present invention further includes an emotional value counter that holds an emotional value numerically representing an intensity of emotion; and each neuron of the long-term memory network unit has an incrementing/decrementing value holding part that holds an incrementing/decrementing value of emotional value to be added to the emotional value held by the emotional counter. It is also preferable that the emotional value counter holds a plurality of types of emotional values for each of emotion types; and the incrementing/decrementing value holding part of each neuron of the long-term memory network unit holds a plurality of incrementing/decrementing values of emotional value respectively for the types of emotional values. It is also preferable that the network control unit sets an incrementing/decrementing value of emotional value in the incrementing/decrementing value holding part of a neuron on the basis of an emotional value held by the emotional value counter when the neuron is added in connection with an input vector given to the long-term memory network unit. It is also preferable that the network control unit adds the incrementing/decrementing value of emotional value held by the incrementing/decrementing value holding part of each neuron to the emotional value held by the emotional value counter when a plurality of mutually related neurons are followed sequentially by using the pointer part of each neuron of the long-term memory network unit. It is also preferable that the pointer part of each neuron of the long-term memory network unit holds a plurality of pieces of pointer information about mutually related other neurons; and the network control unit selects a neurons that holds an incrementing/decrementing value of emotional value similar to the emotional value held by the emotional value counter, from a plurality of neurons as candidates for chaining, when a plurality of mutually related neurons are sequentially followed by using the pointer part of each neuron of the long-term memory network unit.

According to the fourth aspect of the present invention, it is preferable that the network control unit sequentially retrieves neurons that make the emotional values held by the emotional value counter meet a predetermined condition. Preferably, the memory-chaining system according to the fourth aspect of the present invention further includes a short-term memory network unit that partially holds a state of a comparatively highly activated neuron among the neurons of the long-term memory network unit; and the network control unit determines a range of retrieval on the basis of the state of the neuron held by the short-term memory network unit, when sequentially retrieving the neurons that makes the emotional value held by the emotional value counter meet a predetermined condition.

According to a fifth aspect of the present invention, a memory-chaining program product for modeling memory-chaining functions of a brain by using an artificial neural network structure, that is adapted to make a computer execute the procedures of: forming an artificial neural network structure including a plurality of neurons each having a radial-basis function main part that provides an activation intensity corresponding to similarity between an input vector and a centroid vector according to a radial-basis function, and a pointer part that holds pointer information about a mutually related other neuron; and setting pointer information in the pointer part of each neuron on the basis of order of neurons added or activated in a time series in connection with a plurality of input vectors.

Preferably, the memory-chaining program product according to the fifth aspect of the present invention further makes the computer execute the procedure of sequentially following a plurality of mutually related neurons by using the pointer part of each neuron.

In the memory-chaining program product according to the fifth aspect of the present invention, it is preferable that each neuron further has an incrementing/decrementing value holding part that holds an incrementing/decrementing value of emotional value to be added to an emotional value numerically representing an intensity of emotion; and the computer is made to execute the procedure of setting an incrementing/decrementing value of emotional value in the incrementing/decrementing value holding part of a neuron on the basis of the emotional value when the neuron is added in connection with an input vector.

Preferably, the memory-chaining program product according to the fifth aspect of the present invention is adapted to further make the computer execute the procedure of adding, to the emotional value, the incrementing/decrementing value of emotional value held by the incrementing/decrementing value holding part of each neuron, while sequentially following a plurality of mutually related neurons by using the pointer part of each neuron.

Preferably, the memory-chaining program product according to the fifth aspect of the present invention is adapted to further make the computer execute the procedure of sequentially retrieving neurons that make the emotional value meet a predetermined condition.

According to a sixth aspect of the present invention, a neuron element to be used in a memory-chaining system using an artificial neural network structure for modeling memory-chaining functions of a brain includes: a radial-basis function main part that provides an activation intensity corresponding to similarity between an input vector and a centroid vector according to a radial-basis function; and a pointer part that holds pointer information about a mutually related other neuron element.

In the neuron element according to the sixth aspect of the present invention, it is preferable that the pointer part holds a plurality of pieces of pointer information about mutually related other neuron elements.

Preferably, the neuron element according to the sixth aspect of the present invention further includes an incrementing/decrementing value holding part that holds an incrementing/decrementing value of emotional value to be added to an emotional value numerically representing an intensity of emotion.

According to the fourth to sixth aspects of the present invention, the long-term memory network unit uses the artificial neural network structure including the plurality of neurons, and realizes the memory-chaining function by controlling the neurons of the long-term memory network unit (the neurons each having the radial-basis function main part that provides an activation intensity corresponding to similarity between an input vector and a centroid vector according to a radial-basis function, and the pointer part that holds pointer information about a mutually related other neuron) by the network control unit. Thus, learning of memory-chaining can be achieved in a comparatively short time and the memory-chaining function can be easily realized. Since only a few parameters have a high degree of freedom, hardware can be comparatively easily realized.

According to the fourth to sixth aspects of the present invention, each neuron is further provided with the incrementing/decrementing value holding part, and the current emotional value is determined by adding, to the emotional value, the incrementing/decrementing value of emotional value of the neuron followed by memory-chaining. Thus, emotions can be precisely expressed in connection with memory-chaining.

DESCRIPTION OF THE PREFERRED EMBODIMENTS

Preferred embodiments of the present invention will be described with reference to the accompanying drawings.

First Embodiment

A memory system in a first embodiment of the present invention will be described. The memory system in the first embodiment models states of 'intuition' and 'awareness', i.e., psychological functions of the brain, by an artificial neural network structure. Hierarchically arranged generalized regression neural networks (HA-GRNNs) are evolved according to input pattern vectors to explain and embody states of 'intuition' and 'awareness', i.e., psychological functions of the brain.

<Configuration of GRNN>

A generalized regression neural network (GRNN) as a basic element of a hierarchically arranged generalized regression neural network (HA-GRNN) employed in the memory system in the first embodiment will be described.

Figure 2A:
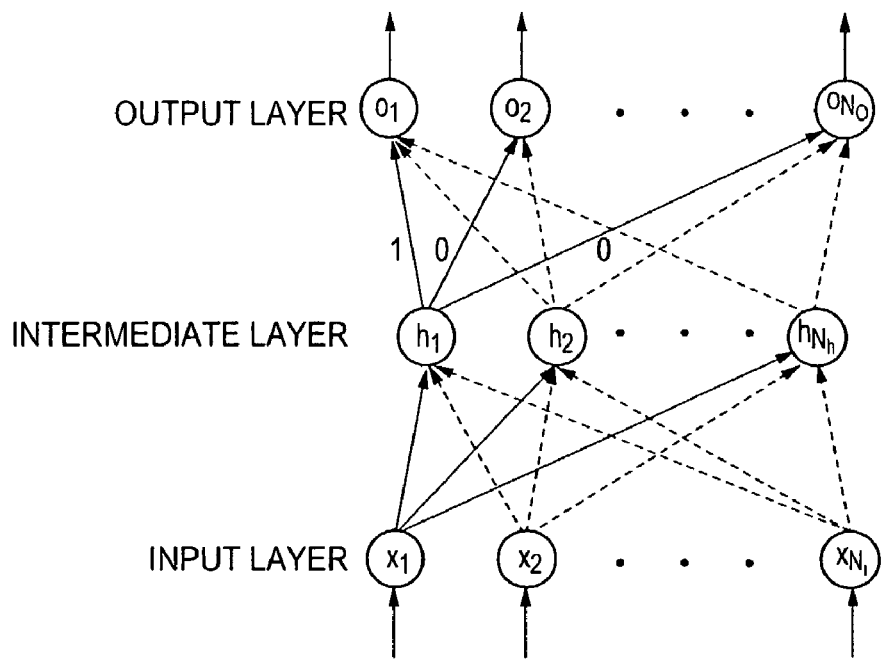
FIGS. 2A and 2B are diagrams of assistance in explaining a generalized regression neural network (GRNN) as a basic element of a hierarchically arranged generalized regression neural network (HA-GRNN) employed in the present invention.

FIG. 2A shows a multilayered generalized regression neural network (ML-GRNN) having $N_i$ input neurons, $N_h$ intermediate neurons, and $N_o$ output neurons.

In FIG. 2A, the input neurons $x_i$ ($i=1, 2, \ldots, N_i$) correspond to the elements of an input vector $\underline{x}=[x_1, x_2, \ldots, x_{Ni}]^T$ (T: vector transpose). In the following description, underlined alphabetical characters represent vectors.

An output neuron $O_k$ ($k=1, 2, \ldots, N_O$) is expressed by Expressions (1) and (2):

$$o_k = \frac{1}{\delta}\sum_{j=1}^{N_b} w_{j,k}\, h_j, \tag{1}$$

where:

$$\delta = \sum_{k=1}^{N_o}\sum_{j=1}^{N_b} w_{j,k}\, h_j, \tag{2}$$

$$\underline{w}_j = [w_{j,1}, w_{j,2},\ldots, w_{j,No}]^T,$$

$$h_j = f(\underline{x}, \underline{c}_j, \sigma_j) = \frac{1}{2\sigma_j^2}\exp\!\left(-\frac{\|\underline{x}-\underline{c}_j\|_2^2}{2\sigma_j^2}\right),$$

where $c_j$ is a centroid vector, $\sigma_j$ is radius, $\underline{W}_j$ is a weight vector between a j-th RBF and the output neurons, and $$\|\cdots\|_2^2$$

is the squared $L_2$ norm.

As shown in FIG. 2A, the configuration of the ML-GRNN is similar to that of a well-known multilayered perception neural network (MLP-NN) (Ref. [7]), except that RBFs are used in the intermediate layer, and linear functions are used in the output layer.

Differing from the conventional MLP-NNs, the GRNNs do not need the iterative training of weight vectors at all; that is, similarly to other RBF-NNs, the GRNNs are adapted to deal with any input-output mapping simply by assigning input vectors to centroid vectors and making weight vectors between the RBFs and outputs coincide with target vectors. This feature of GRNNs is quite beneficial as compared with the nature of prevalently used conventional MLP-NNs that make back-propagation-based weight adaptation, involve long, iterative training, and are unavoidably subject to a danger of their outputs remaining at local minima, which is a very serious problem when the size of a training input vector set is very large.

The specific feature of GRNNs enables flexible formation of networks according to given tasks and is beneficial to the implementation of practical hardware because training can be achieved by adjusting only the two parameters, namely, $c_j$ and $\sigma_j$.

The only disadvantage of GRNNs, as compared with MLP-NNs, is the need for storing all the centroid vectors in a memory space, which often means that GRNNs become exhaustive and, hence, operations in a reference mode (test mode) are complex. Nevertheless, since GRNNs can be regarded as a single element of a memory-based architecture, the aforesaid utility of GRNNs is suggestive of using a neural network as a tool adapted to assist the interpretation of the functions, such as 'intuition' and 'awareness', of the actual brain.

Figure 2B:
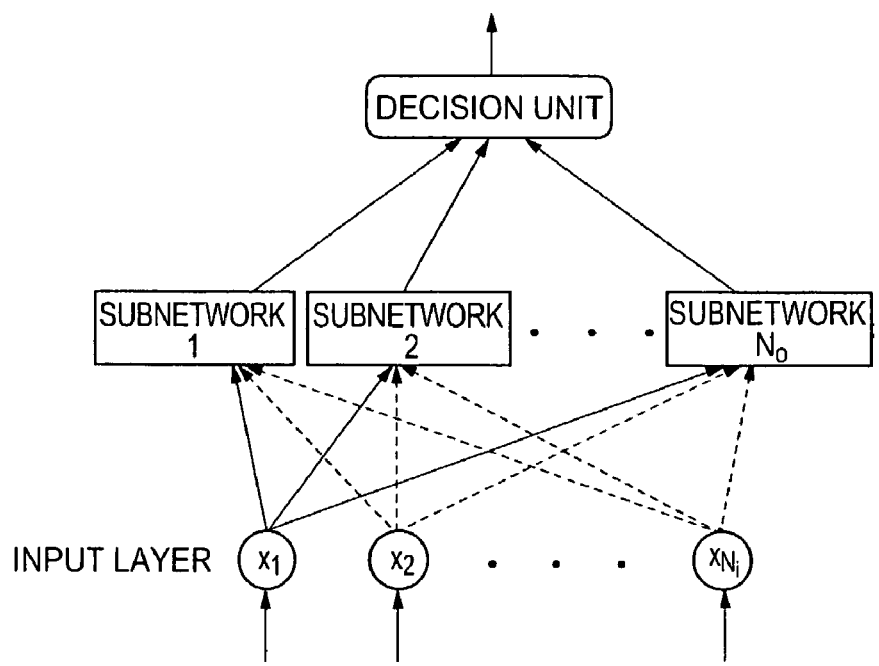

Referring to FIGS. 2A and 2B, a target vector $t(\underline{x})$ corresponding to an input pattern vector $\underline{x}$ is an indicator function vector expressed by Expression (3).

$$t(\underline{x}) = (\delta_1, \delta_2, \ldots, \delta_{No}),$$ (3)

$$\begin{cases} 1 & \text{if } \underline{x} \text{ belongs to the class} \\ \delta_j & = \text{corresponding to } o_k, \\ 0 & \text{otherwise.} \end{cases}$$

When centroid $h_j$ is assigned to $\underline{x}$, and $\underline{w}_j = t(\underline{x})$ is satisfied by the aforesaid property of GRNNs, the entire network is geometrically equivalent to a network having $N_o$ subnetworks and a decision unit as shown in FIG. 2B. In the following description, the term "GRNN" is used to denote a neural network shown in FIG. 2B.

In summary, the network construction using an ML-GRNN is simply done in the following. (In the field of neural networks, such construction is referred to as 'learning'. However, the meaning is rather limited because a network of a ML-GRNN is grown or shrunk by simply assigning an input vector to a corresponding RBF without repeating the adjustment of weight vectors.)

Network Growing: Relation $c_j = \underline{x}$ is set, $\sigma_j$ is fixed, and the term $w_{jk}h_j$ is added to Expression (2). A target vector $t(\underline{x})$ is thus used as a class 'label' indicating the number of a subnetwork to which the centroid (RBF) is to belong, which is equivalent to adding a j-th RBF to a corresponding k-th subnetwork.

Network Shrinking: The term $w_{jk}h_j$ is deleted from Expression (2).

Thus, a dynamic pattern classifier is formed (Ref. [8]). The construction of this network gives a basis for constructing a HA-GRNN employed in the memory system in the first embodiment of the present invention.

<Setting of Radii of GRNN>

Setting of radii is a significant factor of designing a RBF-NN, and such determination is still an unsolved problem (Ref. [7]). In the first embodiment of the present invention, fixed radii are used and set identical for all the centroids in a network according to the following setting in Expression (4):

$$\sigma = \gamma d_{max},$$ (4)

where $\gamma$ is a scalar constant, and $d_{max}$ is the maximum Euclidean distance between the centroid vectors. The entire hyperspace formed during a training phase is moderately (or reasonably) covered by the centroids by the application of Expression (4).

In the first embodiment of the present invention, the values of the radii are updated according to the above when the number of the centroids is varied or when the parameters of the centroids are changed.

<Configuration of Memory System (HA-GRNN)>

The configuration of the memory system in the first embodiment of the present invention will be described with reference to FIGS. 1 to 4.

Figure 1:
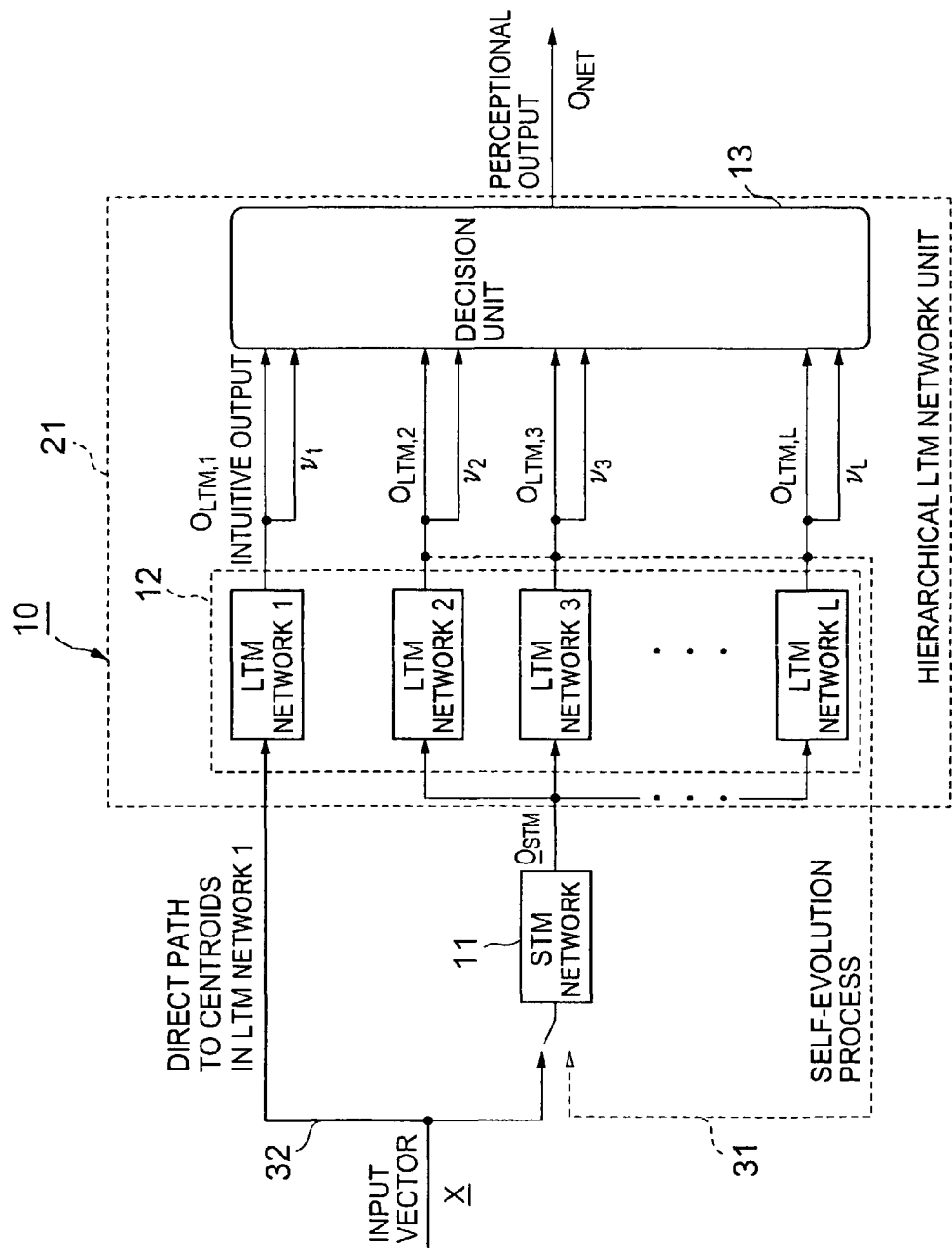
FIG. 1 is a block diagram of a memory system in a first embodiment of the present invention.

Referring to FIG. 1, a memory system 10 in the first embodiment of the present invention is a hierarchical memory system including a short-term memory (STM) model and a long-term memory (LTM) model. The memory system 10 includes a STM network (short-term memory neural network unit) 11 for realizing the STM model; a LTM network group (LTM networks 1 to L) 12 for realizing the LTM model; and a decision unit 13 of a winner-take-all system. The LTM network group 12 and the decision unit 13 constitute a hierarchical LTM network unit (long-term memory neural network unit) 21.

Shown in FIG. 1 are an input pattern vector $\underline{x}$ applied to the memory system 10, an output vector $O_{STM}$ provided by the STM network 11, outputs $O_{LTMi}$ (i=1, 2, . . . , L) provided by the LTM networks 1 to L of the LTM network group 12, weights $v_i$ for weighting the outputs of the LTM network group 12, and an output $O_{NET}$ (perceptional output) of the memory system 10.

The LTM network group 12 is subdivided into a first part including the LTM network 1 for providing 'intuitive outputs', and a second part including the LTM networks 2 to L for providing 'ordinary outputs'.

Figure 3:
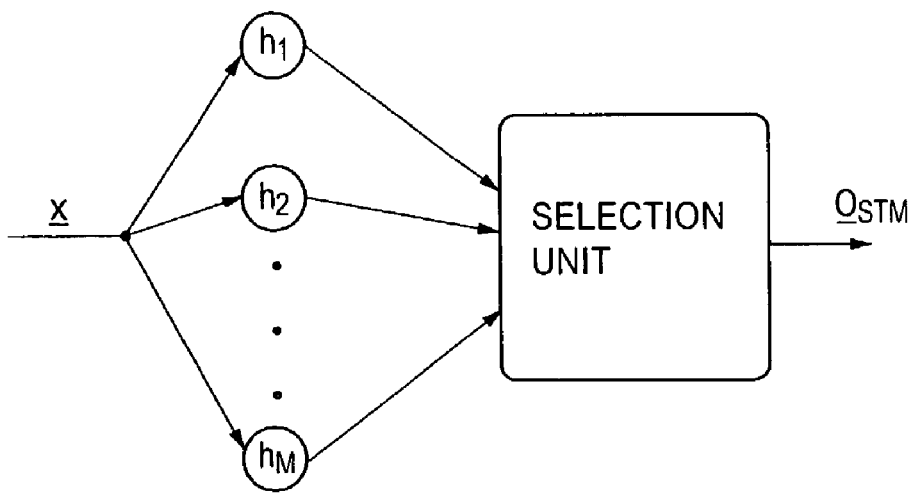
FIG. 3 is a diagrammatic view of a STM network included in the memory system shown in FIG. 1.
Figure 4:
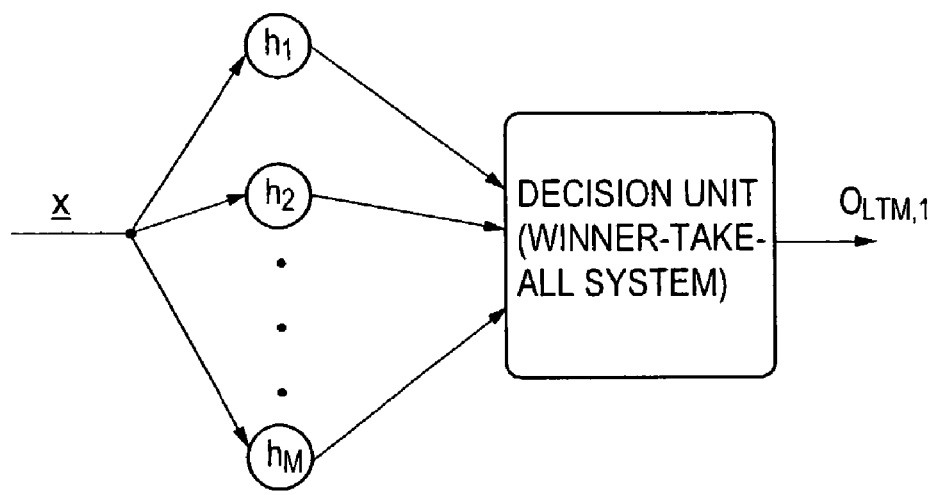
FIG. 4 is a diagrammatic view of a LTM network 1 included in the memory system shown in FIG. 1.

Whereas the LTM networks 2 to L are the same in configuration as the GRNN shown in FIG. 2B, the STM network 11 and the LTM network 1 have a configuration different from that of the ordinary GRNN shown in FIG. 2B and are modifications of a RBF-NN as shown in FIGS. 3 and 4, respectively.

The respective configurations of the STM network 11 and the LTM networks 1 to L will be described with reference to FIGS. 2B, 3 and 4.

<Configuration of STM Network>

Referring to FIG. 3, the STM network, i.e., a modified RBF-NN, has a selection unit that selects the most activated one of centroids $h_1, h_2, \ldots, h_m$. An output $O_{STM}$ of the RBF-NN is a vector value and is not a scalar value calculated by adding up RBF outputs. The STM network 11, unlike the LTM networks which will be described later, does not have any subnetworks and is based on a single-layer structure having the maximum centroid $M_{STM}$. Therefore, the STM network 11 has a configuration analogous with that of a queuing system of a length dependent on the factor $M_{STM}$.

<Configuration of LTM Networks>

Each of the LTM networks shown in FIG. 1, similarly to the STM network, has a maximum number of centroids. The LTM networks excluding the LTM network 1 have the configuration of a GRNN and not that of a RBF-NN. Therefore, each of the LTM networks excluding the LTM network 1, has the subnetworks and the decision unit as shown in FIG. 2B. In contrast, the LTM network 1, as shown in FIG. 4, has centroids not having a summing operation unit at the output. As shown in FIG. 4, the output $O_{LTM1}$ of the LTM network 1 is the most activated centroid, such as the first centroid $h_1$, chosen by the 'winner-takes-all' strategy. The number of centroids in the LTM network 1 varies due to the following reasons.

As mentioned above, the memory system 10 is motivated by biological (psychological) studies of the hierarchical memory system of the actual brain (Refs. [9], and [14] to [18]). The roll of the STM network in the memory system 10 is the temporary buffering of input pattern vectors given to the memory system 10 before the input pattern vectors are stored in the LTM networks. On the other hand, the roll of the LTM network group is to realize a hierarchical classification system based on the 'importance' or 'attractiveness' of information by hierarchically arranging the LTM networks 1 to L.

Figure 5:
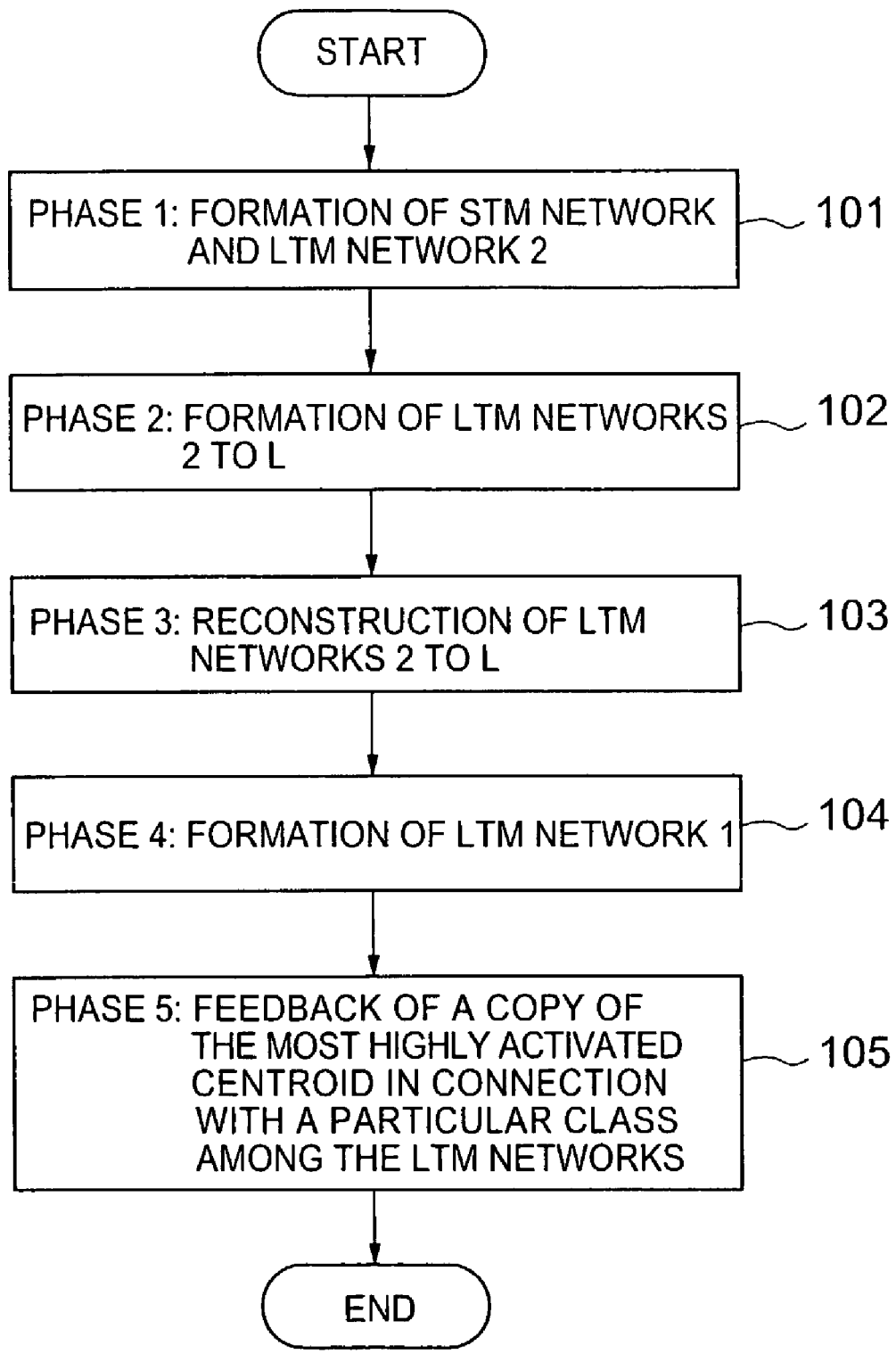
FIG. 5 is a flow chart of assistance in explaining a development process of developing the memory system in the first embodiment of the present invention.

In the first embodiment of the present invention, the memory system 10 is constructed on the basis of the activation intensities of all the centroids in the STM network unit and the LTM network group by five phases 101 to 105 shown in FIG. 5.

<Phase 1: Formation of STM Network and LTM Network 2>

The STM network is formed by the following procedure in phase 1.

Step 1: Add, to the STM network, a RBF having an activation intensity $h_i$ calculated by using Expression (2) and its centroid vector $c_i = \underline{x}$ when the number M of centroids is smaller than $M_{STM}$. Thus, the output vector $\underline{O}_{STM}$ of the STM network is equal to $\underline{x}$.

Step 2: Otherwise, execute the following steps.

Step 2.1: If the intensity of activation of the least activated centroid, the intensity $h_j$ of the j-th centroid by way of example, meets: $h_j < th_{STM}$, replace the same centroid with a new centroid that makes centroid vector $c_j = \underline{x}$. In this case the output $\underline{O}_{STM} = \underline{x}$.

Step 2.2: Otherwise, adjust the output $\underline{O}_{STM}$ by using Expression (5).

$$\underline{O}_{STM} = \lambda c_k + (1-\lambda)\underline{x}, \quad (5)$$

where $c_k$ is the centroid vector of the most activated centroid $h_k$ (k-th centroid), and $\lambda (0 \leq \lambda \leq 1)$ is a smoothing factor.

In step 2, the smoothing factor $\lambda$ is a measure to determine how fast the STM network is evolved by a new incoming pattern vector given to the network; that is, the smoothing factor $\lambda$ determines how quickly the STM network switches focus to other patterns. This can be regarded as 'selective attention' to a particular object. For example, the output $\underline{O}_{STM}$ is more likely to approach $\underline{x}$ when the smoothing factor $\lambda$ is small, which can be regarded as a sign of 'carelessness'. In contrast, the STM network becomes 'sticky' to particular patterns when the smoothing factor $\lambda$ is large. This also relates to the notion of 'awareness', which will be described later.

When the STM network is thus formed in Phase 1, the LTM network 2 is formed by directly assigning the output vectors of the STM network to the centroids in the LTM network 2; that is, in an initial stage of an evolution process (i.e., a stage from the first application of an incoming input pattern vector to the LTM network 2, to the saturation of the LTM network 2), the centroids within the LTM network 2 are distributed to the subnetworks according to a class 'label', which is given by the target vector consisting of a series of indicator functions defined by Expression (3), associated with the centroid vectors because each LTM network is represented by a GRNN.

Thus, the addition of the centroids to the subnetworks $i (i=1, 2, \ldots, N_{cl}$, where $N_{cl}$ is the number of classes equal to that of subnetworks of each LTM network) of the LTM network 2 is repeated until the total number of centroids in the subnetwork i of each LTM network reaches a maximum number $M_{LTM2,i}$. Otherwise, the least activated centroid in the subnetwork i is moved to the LTM network 3. The numbers of the subnetworks of the LTM networks 2 to L are the same.

This procedure corresponds to the foregoing Phase 2 and is summarized as follows. (Please assume that the STM output vector belongs to Class i in the following explanations.)

<Phase 2: Formation of LTM Networks 2 to L>

Step 1: Execute the followings for steps j−1 to L−1. If the number of the centroids in the subnetwork i of the LTM network j reaches $M_{LTMj,i}$, move the least activated centroid of the subnetwork i of the LTM network j to the LTM network j+1.

Step 2: If the number of the centroids in the subnetwork i of the LTM network L reaches $M_{LTML,i}$, i.e., if all the i-th subnetworks of the LTM networks 2 to L are saturated, there is no storage area available for storing a new STM output vector. Therefore, the following steps are executed.

Step 2.1: Discard the least activated centroid in the subnetwork i of the LTM network L.

Step 2.2: Shift all the least activated centroids in the subnetworks i of the LTM networks L−1 to 2 to the LTM networks L to 3, respectively.

Step 2.3: Store a new output vector provided by the STM network in the subnetwork i of the LTM network 2.

Step 2 is a procedure similar to a FILO queue (first-in-last-out queue).

Phase 2 is based on a hypothesis that the LTM network group (LTM networks 2 to L) has a layered structure. The decision unit 13 selects the output $O_{NET}$ of the memory system 10 as the largest one of the outputs $O_{LTM,i}$ (i=1, 2, ..., L) of the LTM network group as expressed by Expression (6).

A weight $v_1$ for weighting the output $O_{LTM,1}$ of the LTM network 1 of the LTM network group is comparatively large as compared with those for weighting the other outputs as expressed by Expression (7). This discrimination indicates the provision of an 'intuitive output' by the memory system 10.

$$O_{NET} = \max(v_1 \cdot O_{LTM,1}, v_2 \cdot O_{LTM,2}, \ldots, v_L \cdot O_{LTM,L}), \quad (6)$$

$$v_1 \gg v_2 > v_3 > \ldots > v_L. \quad (7)$$

After the formation of the LTM network group in Phase 2, the LTM network group is reconstructed in Phase 3. A reconstruction process is invoked at a particular time, in a particular period or when the activation of the centroids in some of the LTM networks is enhanced. Processing of input pattern vectors is inhibited during the reconstruction of the LTM network group.

Phase 3 has the following steps.

<Phase 3: Reconstruction (Self-Evolution) of LTM Network Group (LTM Networks 2 to L)>

Step 1: Collect all the centroid vectors in the LTM networks 2 to l (l<=L).

Step 2: Set the collected centroid vectors as incoming input pattern vectors.

Step 3: Give the incoming input pattern vectors one by one to the memory system 10. This process is repeated p times. (In FIG. 1, the arrow 31 indicates Step 3.)

Phase 3 is executed to shape up a pattern space spanned by the centroids in the LTM networks 2 to L.

An approach to the reconstruction of the LTM network group as mentioned in Ref. [8] may be used as an alternative to the foregoing method of reconstructing the LTM network group including an instance-based operation. This alternative approach constructs a new LTM network group by compressing the existing LTM network group by clustering techniques. However, as previously reported, it is possible that the clustering techniques collapse a pattern space as the number of representative vectors decreases.

In Phase 4, the parameters of some of the centroids relatively highly activated in a certain period in the LTM networks 2 to L are moved to the LTM network 1. Eventually each centroids newly assigned to the LTM network 1 forms a RBF-NN and has direct connection with an input vector.

<Phase 4: Formation of LTM Network 1>

Step 1: Count the frequency of activation of the most activated centroid among those in the LTM networks 2 to L to monitor the most activated centroid every time an input pattern vector is given to the memory system 10 during the formation and reconstruction of the LTM network group in Phases 2 and 3. The frequency of activation is incremented when the class ID of the incoming pattern vector matches that of the most activated centroid.

Step 2: List all the counted frequencies of activation of the centroids in the LTM networks 2 to L in a particular time or period q to find N centroids having the largest frequencies of activation. The value of N meets a condition represented by Expression (8).

$$N << \sum_i \sum_j M_{LTMj,i} \qquad (8)$$

Step 3: Move all the N centroids to the LTM network 1 if the total number of centroids in the LTM network 1 is less than or equal to $M_{LTM1}-N$ ($M_{LTM1}$ is the maximum number of the centroids in the LTM network 1 and it is assumed that $N \leq M_{LTM1}$). Otherwise, leave the ($M_{LTM1}-N$) centroids in the LTM network 1 untouched and replace the rest of the centroids in the LTM network 1 with N new centroids.

Step 4: Create a direct path to the input pattern vector for each centroid to be added by Step 3. (The arrow 32 in FIG. 1 indicates this process.)

Note that, unlike the other LTM networks 2 to L, the radii of the centroids in the LTM network 1 must not be varied during evolution because the high activation of each centroid by the radii is expected to continue after the N centroids have been moved to the LTM network 1.

The foregoing four phases give a basis of evolution of the memory system 10; and the interpretation of the notion of the two psychological functions of the brain (i.e., 'intuition' and 'awareness') is conducted under the evolution of the memory system 10 as follows.

<Interpretation of 'Intuition' and 'Awareness'>
<HA-GRNN Modeling 'Intuition'>

In our daily life, we sometimes encounter an occasion where we can understand that a matter is true, but we cannot explain why the matter is true, and cannot give evidence of the matter being true or corroborate that the matter is true. Such an occasion is considered to be a notion of the so-called 'intuition'.

Conjecture 1: In the HA-GRNN employed in the memory system 10, 'intuition' can be interpreted such that a particular set of abnormally highly activated centroids exist in the LTM network group for a particular input pattern vector.

Conjecture 1 is derived from a standpoint that the notion of intuition can be explained in terms of information processing pertaining to particular activities of neurons of the brain (Ref. [19]).

Note that, in FIG. 1, there are two paths of input pattern vectors given to the memory system 10, which signifies that the output of the memory system 10, for ordinary input pattern vectors, will be generated after transferring the input pattern vectors to the two-stage memory (i.e., the STM network and the LTM network group), while certain input patterns excite some neurons in the LTM network 1 enough to generate 'intuitive' outputs.

As mentioned above in connection with the description of the evolving process of the memory system 10, evidence of the output of the LTM network 1 being an intuitive output is that the LTM network 1 is formed after the long, iterative exposition of input pattern vectors that highly activate a particular number of centroids in the LTM networks 2 to L. In other words, the transition of the centroids from the STM network to the LTM networks 2 to L is regarded as a normal learning process, and the transition of the centroids from the LTM networks 2 to L to the LTM network 1 provides a chance for the memory system 10 to generate 'intuitive' outputs.

In contrast, we often hear such episodes as "A brilliant idea flashed into my mind.", "While I was asleep, I was suddenly awaken by a horrible nightmare." and such. It can also be postulated that those episodes, similarly to intuition, are phenomena occurred in the brain during the self-evolution process of memory. In the context of the HA-GRNN employed in the memory system 10, this is related to Phase 3 in which some of the centroids in the LTM network group are activated well beyond a specific activation level during the reconstruction of the LTM network group. Sometimes, those centroids, such as particularly memorable events, remain in the LTM network group for a comparatively long period or virtually permanently. This interpretation also relates to biological facts (Refs. [20] and [21]) that once a person has acquired a behavioral skill, the person would not forget the same for a long time.

<HA-GRNN Modeling 'Awareness'>

In this specification, the word 'consciousness or awareness' will be used limitedly in the context of the HA-GRNN without admitting interpretation using self-recurrence.

Recently, the notion of 'consciousness or awareness', in a narrow sense, has motivated and been utilized for the development of intelligent robotics (Refs. [2] to [5]). For example, a concrete model, in which maze-path finding is achieved by an artificial mouse, has been devised (Refs. [5] and [24]). The movement of the artificial mouse is controlled by a hierarchically conceptual model, the so-called 'consciousness architecture' (Ref. [24]). In this model, the mouse can continue maze-path finding by the introduction of a higher layer of memory representing the state of 'being aware' of the path-finding pursuit, while the lower part is used for the actual movement and the states are controlled by the higher layer of memory.

In the context of the HA-GRNN, the model coincides with the evidence of having a 'hierarchical' structure for representing the notion of 'awareness'. Accordingly, the following Conjecture 2 can be formed.

Conjecture 2: State of being 'aware' of something is expressed in terms of the centroids in the STM network.

In the HA-GRNN, the transition of the centroids from the STM network to the LTM networks is regarded as 'feedforward transition', and hence it is natural to consider 'feedback transition' from the LTM networks to the STM network. Therefore, it is preferable to add the following Phase 5, which contrasts with a feedforward transition process in Phases 2 and 3, to the evolution process of the HA-GRNN (FIG. 5).

<Phase 5: Feedback from LTM Networks to STM Network (Formation of 'Awareness' States)>

Step 1: Collect m centroids that have been excessively activated by the largest number of times among those for particular classes in the LTM network group. This step corresponds to 'awareness' states of the HA-GRNN.

Step 2: Replace the m least activated centroids among the centroids in the STM network with copies of the m centroids. The ($M_{STM}-m$) most activated centroids are kept untouched. The m centroids thus selected remain in the STM network for a certain long period without changing their centroid vectors (the radii may be changed).

In Phase 5, the radii of the m centroids thus copied may change because the parameters of the rest of the centroids in the STM network can be varied during learning. In other words, it is also postulated that the ratio in number between the m centroids and the ($M_{STM}$-m) centroids remaining in the STM network explains the 'level of awareness'. Thus, Conjecture 3 is formed.

Conjecture 3: The level of awareness can be determined by the ratio in number between the m most activated centroids selected from the LTM networks and the ($M_{STM}$-m) centroids remaining in the STM network. This is regarded as a part of a learning process.

Conjecture 3 is also related to the neurophysiological evidence of 'rehearsing' activity (Ref. [16]) by which information acquired by learning would be gradually stored as a long-term memory.

In the context of the HA-GRNN employed in the memory system 10, an incoming input pattern vector or a set of pattern vectors can be compared to input information to the brain, and those are stored temporarily in the STM network serving as a buffer memory. Information represented by the centroids in the STM network is selectively transferred to the LTM networks during evolution as mentioned in connection with the description of Phases 1 to 3. The centroids in the LTM networks may be transferred back to the STM network because 'awareness' of certain classes of those centroids occurs at particular moments. This interaction is therefore compared to the 'learning' process (Ref. [16]).

In the context of the HA-GRNN employed in the memory system 10, the evolution process given in an early stage is not autonomous in a strict sense. Therefore, a state of 'awareness' can be programmed in advance according to given problems. However, it is also possible to evolve the HA-GRNN autonomously by properly setting transition operations in particular applications. For example, in the context of a pattern classification task, the number N of the classes may be limited so as to meet N<$N_{max}$, such that "The HA-GRNN is aware of only N classes among $N_{max}$ classes."

As apparent from the foregoing description, according to the first embodiment of the present invention, the STM network 11 for temporarily storing input pattern vectors are formed in Phases 1 and 2, and the layered LTM networks 2 to L are formed sequentially by assigning the output vectors provided by the STM neural network 11 as input vectors. Therefore, the LTM neural network system including the LTM networks 2 to L is able to clearly and easily realize a hierarchical classifying system based on the 'importance', 'attractiveness' or the like of information. Thus, high generalization performance for given tasks can be realized.

According to the first embodiment of the present invention, the LTM networks 2 to L are GRNNs each having the plurality of radial basis functions as centroids (neurons). Therefore, iterative learning of weight vectors is not necessary at all; and a network can be flexibly formed for given tasks.

According to the first embodiment of the present invention, in Phase 4, the parameters of some of the relatively highly activated centroids in the LTM networks 2 to L are moved to form the LTM network for intuitive outputs, to which input pattern vectors are applied directly, i.e., the LTM network 1. Thus, 'intuition', i.e., one of psychological functions of the brain, can be modeled by making the memory system 10 learn so that an 'intuitive' output can be produced from some of the centroids in the LTM network 1.

According to the first embodiment of the present invention, in Phase 5, the comparatively highly activated centroids among those belonging to particular classes in the LTM networks 2 to L are fed back to the STM network. Therefore, the generalization performance for the particular classes in the STM network 11 that receives the input pattern vector first is enhanced. Therefore, the state of 'awareness', i.e., one of the psychological functions of the brain can be artificially created.

Furthermore, according to the first embodiment of the present invention, in Phase 3, the reconstruction process is invoked at a particular time, in a particular period or when the activation of the centroids in some of the LTM networks is enhanced to reconstruct the LTM networks 2 to L. Thus, the generalization performance of the overall network can be enhanced. According to the first embodiment of the present invention, the LTM networks 2 to L of the LTM network group are reconstructed by using the centroid vectors of the LTM networks 2 to L of the LTM network group again as input pattern vectors to the STM network 11. Thus, the reconstruction process can be efficiently carried out.

Figure 13:
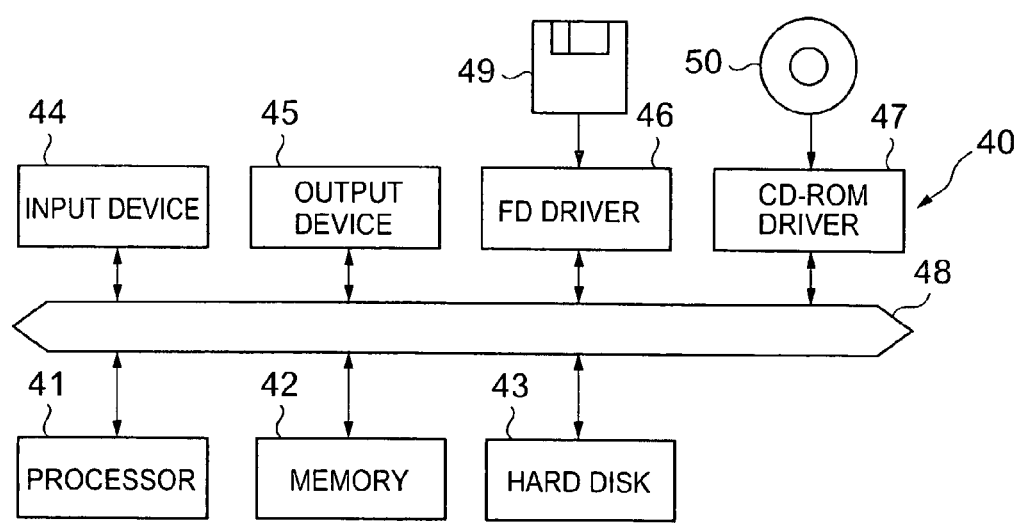
FIG. 13 is a block diagram of a computer system to which the first and second embodiments of the present invention are applied.

A method of forming an artificial neural network structure modeling the psychological functions of the brain in the memory system 10 in the first embodiment can be easily realized in a program product that can be executed by a computer system 40 as shown in FIG. 13. The computer system 40 includes a processor 41, a memory 42, a hard disk 43, and peripheral devices including an input device 44 including a keyboard and a mouse, output device 45 including a display and a printer, a flexible disk drive (FD drive) 46, a CD-ROM drive 47, and a bus 48 interconnecting those component devices. The program is stored in a readable recording medium, such as a FD 49 or a CD-ROM 50; and the processor 41 reads instructions included in the program sequentially from the recording medium, and executes the instructions to carry out the foregoing procedures.

Examples

Concrete examples of the first embodiment will be described hereinafter. In this example, simulation experiments were conducted using a typical pattern set for a digit voice classification task for constructing a HA-GRNN as a memory system to validate the modeling of the states of 'intuition' and 'awareness', i.e., psychological functions of the brain.

In the simulation experiments, a data set extracted from the SFS database ([Ref. [25]] is used to construct a HA-GRNN. The SFS database is a public domain database used for a benchmark for pattern classification tasks. In the simulation experiments, the data set consists of 900 utterances in total of the digits from /ZERO/ to /NINE/. Utterances are recorded in English by nine different speakers (including even number of female and male speakers). The data set was arbitrarily divided into two data sets One of the two data sets was used for constructing the HA-GRNN, namely, incoming pattern set; and the other was used for testing. The data set for constructing the HA-GRNN included 540 speech samples in total, where an equal number of 54 samples were chosen for each digit, while the data set for testing included 360 samples (36 samples per each digit). In both the data sets, each utterance was sampled at a frequency of 20 kHz and was converted into a feature vector with a normalized set of 256 data points obtained by the well-known LPC-mel-cepstral analysis (Ref. [36]). Therefore, the feature vectors were used as input pattern vectors to be given to the HA-GRNN.

<Setting Parameters of HA-GRNN>

Parameters for constructing the HA-GRNN used by the simulation experiments are tabulated in Table 1.

TABLE 1

Network Configuration Parameters for the HA-GRNN

| Parameter | Value |
|---|---|
| Max. num. of centroids in STM | $M_{STM} = 30$ |
| Total num. of LTM networks | $(L + 1) = 3$ |
| Max. Num. Of centroids in LTM 1 | $M_{LTM1} = 5$ |
| Num. Of subnetworks in LTM 2 & 3 | $N_{cl} = 10$ |
| Max. num. of centroids in each subnetwork in LTM 2 & 3 | $M_{LTM2,i} = 4, M_{LTM3,i} = 4$ $(i = 1, 2, \ldots, 10)$ |

In Table 1, $M_{LTM1}$, $M_{LTM2i}$ and $M_{LTM3i}$ (i=1, 2, ..., 10, which correspond to class IDs 1, 2, ..., 10, respectively) are arbitrarily chosen, and $N_{cl}$ must be chosen equal to the number of the classes, i.e., the ten digits. With this setting, the total number of centroids in LTM network from 1 to 3, $M_{LTM,Total}$, is calculated by using Expression (9). The calculated number is 85.

$$M_{LTM,Total} = M_{LTM,1} + N_{C1}(M_{LTM,2} + M_{LTM,3}). \quad (9)$$

<Setting of STM Network>

In the experiments, the choices of $M_{STM}=30$ in Table 1 and $\gamma=2$ in Expression (4) were used for designing the STM network. The STM network covered all the ten classes sparsely and reasonably during construction and functioned as a buffer memory to the LTM networks. In Expression (5), $th_{STM}=0.1$ and the smoothing factor $\lambda=0.6$. In the preliminary simulation experiments, it was empirically found that the HA-GRNN exercised a more satisfactory generalization performance when $\lambda=0.6$ than the case with the k-means clustering method (Ref. [27]).

<Setting of LTM Networks>

It was found that $\gamma=1/4$ in Expression (4) was a reasonable choice to maintain a satisfactory generalization performance during an evolution process for setting the radii of the LTM networks 2 to L. The value of $v_1$ was fixed at 2.0 and values of $v_i$ (i=2, 3, ..., L) were given by linear decay represented by Expression (10).

$$v_i = 0.8(1 - 0.05(i-2)). \quad (10)$$

<Scheduling of Evolution Process>

Figure 6:
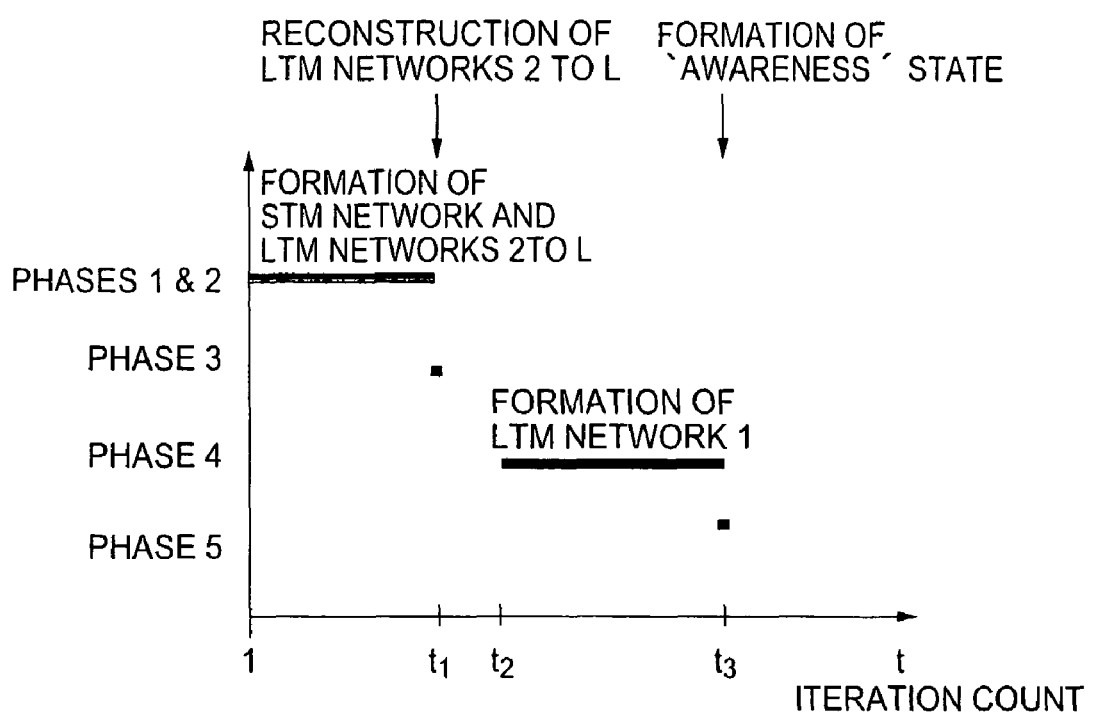
FIG. 6 is a diagram of assistance in explaining a schedule of the development process in an example (simulation experiments) of the first embodiment of the present invention.

FIG. 6 shows a schedule of an evolution process for the simulation experiments by way of example. In FIG. 6, t corresponds to the t-th pattern vector applied to the HA-GRNN. In the simulation experiments, $t_1=200$, $t_2=201$ and $t_3=400$ were used to cover all Phases 1 to 5. As mentioned above, the formation of the LTM network 1, which occurs after the passage of the evolution time $t_2$, was scheduled to occur after the relatively long exposition of incoming input pattern vectors. In the simulation experiments, the reconstruction of the LTM network group in Phase 3 is scheduled to occur at $t_1$. The evolution process was eventually stopped at t=540 (the number of all the incoming vectors for learning). In the simulation experiments, the self-evolution of the HA-GRNN, which occurred at $t_1$, was scheduled for p=2; that is, the self-evolution process was repeated twice and it was found that this setting did not affect the generalization performance at all.

<Results of Simulation>

The pattern-recognizing ability of the HA-GRNN was examined. After the completion of the evolution process, the STM network was skipped over and only the LTM networks 1 to L were used to evaluate the generalization performance during the examination.

Table 2 shows a confusion matrix obtained by using the HA-GRNN after the completion of the evolution process.

TABLE 2

Confusion Matrix Obtained by the HA-GRNN After the Evolution

| Digit | 0 | 1 | 2 | 3 | 4 | 5 | 6 | 7 | 8 | 9 | Total | Generalization Performance |
|---|---|---|---|---|---|---|---|---|---|---|---|---|
| 0 | 29 | | | 3 | | 2 | 1 | | | 1 | 29/36 | 80.6% |
| 1 | | 31 | | | 1 | 2 | | | | 2 | 31/36 | 86.1% |
| 2 | | | 31 | 1 | 3 | | 1 | | | | 31/36 | 86.1% |
| 3 | | | | 31 | 3 | 1 | | 1 | | | 31/36 | 86.1% |
| 4 | | | | | 36 | | | | | | 36/36 | 100.0% |
| 5 | | 3 | | | 1 | 27 | | 2 | | 3 | 27/36 | 75.0% |
| 6 | | | | | | | 32 | 2 | 2 | | 32/36 | 88.9% |
| 7 | | | 4 | | | | | 32 | | | 32/36 | 88.9% |
| 8 | | | | | | | 1 | 1 | 34 | | 34/36 | 94.4% |
| 9 | | 4 | | | | 10 | | 1 | | 21 | 21/36 | 58.3% |
| Total | | | | | | | | | | | 304/360 | 84.4% |

In this case, any 'awareness' states were not formed at $t_3$. Table 3 shows, for comparison, a confusion matrix obtained by using a conventional GRNN having the same number of centroids (85 centroids) in each subnetwork as the HA-GRNN.

TABLE 3

Confusion Matrix Obtained by the Conventional GRNN Using k-Means Clustering Method

| Digit | 0 | 1 | 2 | 3 | 4 | 5 | 6 | 7 | 8 | 9 | Total | Generalization Performance |
|---|---|---|---|---|---|---|---|---|---|---|---|---|
| 0 | 35 | | | 1 | 1 | | | | | | 34/36 | 94.4% |
| 1 | | 17 | | | 19 | | | | | | 17/36 | 47.2% |

TABLE 3-continued

Confusion Matrix Obtained by the Conventional GRNN Using k-Means Clustering Method

| Digit | 0 | 1 | 2 | 3 | 4 | 5 | 6 | 7 | 8 | 9 | Total | Generalization Performance |
|---|---|---|---|---|---|---|---|---|---|---|---|---|
| 2 |  |  | 28 |  | 8 |  |  |  |  |  | 28/36 | 77.8% |
| 3 |  |  | 3 | 22 | 10 | 1 |  |  |  |  | 22/36 | 61.1% |
| 4 |  |  |  |  | 36 |  |  |  |  |  | 36/36 | 100.0% |
| 5 |  |  |  |  |  | 36 |  |  |  |  | 36/36 | 100.0% |
| 6 |  |  |  |  | 1 | 1 | 34 |  |  |  | 34/36 | 94.4% |
| 7 | 1 |  | 3 |  | 3 | 6 |  | 23 |  |  | 23/36 | 63.9% |
| 8 |  |  |  |  | 2 | 1 | 1 |  | 32 |  | 32/36 | 88.9% |
| 9 |  | 1 |  |  | 27 |  |  |  |  | 8 | 8/36 | 22.2% |
| Total |  |  |  |  |  |  |  |  |  |  | 270/360 | 75.0% |

Each of the centroids was found by the well-known McQueen's k-means clustering method (Ref. [27]). To ensure fair comparison, the centroids in each subnetwork were obtained by applying the k-means clustering method to each subset including 54 samples (of incoming pattern vectors) for each of digits /ZERO/ to /NINE/.

It is known from the comparison of the confusion matrices shown in Tables 2 and 3 that the HA-GRNN is superior in generalization performance to the conventional GRNN substantially throughout all the classes, and the generalization performance of the HA-GRNN with the digits excluding the digit /NINE/ is relatively high, whereas the performance of the conventional GRNN varies from digit to digit as shown in Table 3. This fact indicates that a pattern space spanned by the centroids obtained by the k-means clustering method is biased.

<Generation of Intuitive Outputs>

In the simulation experiments, intuitive outputs were generated three times during the evolution process. The two intuitive outputs out of the three intuitive outputs were classified correctly as digit /TWO/. During the tests, 16 pattern vectors among 360 pattern vectors made the LTM network 1 yield intuitive outputs; and 13 pattern vectors among the 16 pattern vectors were correctly classified. It was found that the Euclidean distances between the 12 pattern vectors and the centroid vectors respectively corresponding to their class IDs (digit numbers) were relatively small and close to the minimum. Actually, the distances between the pattern numbers 83 and 89, and the centroids of digits /TWO/ and /EIGHT/ in the LTM network 1 were minimal. It is known from the results of the simulation experiments that intuitive outputs are likely to be generated when the incoming pattern vectors are very close to the centroid vectors, respectively, in the LTM network 1.

<Simulation Experiments on Modeling 'Awareness' States>

It is known from Table 2 that the generalization performance for digits /FIVE/ and /NINE/ are relatively unsatisfactory. 'Awareness' states were created intentionally for digits /FIVE/ and /NINE/ to evaluate the effect of having an 'awareness' model in the HA-GRNN. Ten centroids among 30 centroids in the STM network were fixed at digits, respectively, after the evolution time $t_3$ according to Conjectures 2 and 3. Since the unsatisfactory generalization performance for the digits /FIVE/ and /NINE/ are perhaps due to the insufficient number of the centroids for those classes, the maximum numbers $M_{LTM2,i}$ and $M_{LTM3,i}$ (i=5 and 10) of centroids in the LTM network 2 and 3 were increased.

Table 4 shows a confusion matrix obtained by the HA-GRNN having an 'awareness' state of only a digit /NINE/.

TABLE 4

Confusion Matrix Obtained by the HA-GRNN After the Evolution (With a 'Awareness' State of Digit 9)

| Digit | 0 | 1 | 2 | 3 | 4 | 5 | 6 | 7 | 8 | 9 | Total | Generalization Performance |
|---|---|---|---|---|---|---|---|---|---|---|---|---|
| 0 | 30 |  |  | 1 | 3 |  | 2 |  |  |  | 30/36 | 83.3% |
| 1 |  | 31 |  |  | 2 | 2 |  |  |  | 1 | 31/36 | 86.1% |
| 2 |  |  | 31 | 1 | 3 |  |  | 1 |  |  | 31/36 | 86.1% |
| 3 |  |  |  | 31 | 3 | 1 |  | 1 |  |  | 31/36 | 86.1% |
| 4 |  |  |  |  | 36 |  |  |  |  |  | 36/36 | 100.0% |
| 5 |  | 3 |  |  | 1 | 28 |  | 2 |  | 2 | 28/36 | 77.8% |
| 6 |  |  |  |  |  |  | 32 | 2 | 2 |  | 32/36 | 88.9% |
| 7 |  |  | 4 |  |  |  |  | 32 |  |  | 32/36 | 88.9% |
| 8 |  |  |  |  |  |  | 1 | 1 | 34 |  | 34/36 | 94.4% |
| 9 |  | 2 |  |  |  | 12 |  |  |  | 22 | 22/36 | 61.1% |
| Total |  |  |  |  |  |  |  |  |  |  | 307/360 | 85.3% |

In this case, 8 centroids in total in the LTM networks 2 and 3, i.e., 4 centroids in each of the LTM networks 2 and 3 (the first 8, not 4, most activated centroids selected after Phase 4 were added to the respective subnetworks 10 of the LTM networks 2 and 3. That is, the total number of the centroids in the LTM networks 1 to 3 was increased up to 93. As obvious from Table 4, the generalization performance of the digit /NINE/ was improved by 61.1% as based on the generalization performance shown in Table 2. It is interesting to note that the generalization performance of digits /ZERO/ and /FIVE/ was improved as the consequence of improvement of that of the digit /NINE/.

Table 5 shows a confusion matrix obtained by the HA-GRNN having 'awareness' states of both the digits /FIVE/ and /NINE/.

TABLE 5

Confusion Matrix Obtained by the HA-GRNN After Evolution (With 'Awareness' States of Digits 5 and 9)

| Digit | 0 | 1 | 2 | 3 | 4 | 5 | 6 | 7 | 8 | 9 | Total | Generalization Performance |
|---|---|---|---|---|---|---|---|---|---|---|---|---|
| 0 | 30 |   |   | 1 | 3 |   | 2 |   |   |   | 30/36 | 83.3% |
| 1 |   | 31 |   |   | 2 | 2 |   |   |   | 1 | 31/36 | 86.1% |
| 2 |   |   | 31 | 1 | 3 |   | 1 |   |   |   | 31/36 | 86.1% |
| 3 |   |   |   | 32 | 4 |   |   |   |   |   | 32/36 | 88.9% |
| 4 |   |   |   |   | 36 |   |   |   |   |   | 36/36 | 100.0% |
| 5 |   | 1 |   |   | 1 | 33 |   |   |   | 1 | 33/36 | 91.7% |
| 6 |   |   |   |   |   |   | 32 | 2 | 2 |   | 32/36 | 88.9% |
| 7 |   |   | 4 |   |   |   |   | 32 |   |   | 32/36 | 88.9% |
| 8 |   |   |   |   |   |   | 1 | 1 | 34 |   | 34/36 | 94.4% |
| 9 |   | 3 | 1 |   | 10 |   |   |   |   | 22 | 22/36 | 61.1% |
| Total |   |   |   |   |   |   |   |   |   |   | 313/360 | 86.9% |

Similarly to the case of the 'awareness' state of the digit /NINE/, 16 centroids in total for the two digits were added to each of the subnetworks 6 and 10 of the LTM networks 2 and 3. Thus, the total number of centroids in the LTM networks 1 to 3 was increased to 101. As compared with the case shown in Table 2, the generalization performance for the digit /FIVE/, similarly to that for the digits /ZERO/, /THREE/ and /NINE/, as improved drastically.

It is known from those results that, since the improvement of generalization performance for the digit /NINE/ in both the cases was not expected, the pattern space for the digit /NINE/, as compared with those for other digits, is difficult to cover completely.

Thus, the results of the simulation experiments validated the evolution process in the range of the pattern classification task. More concretely, the effectiveness of generalization performance was examined and the superiority of the HA-GRNN to the conventional GRNN using the k-mean clustering method was proved.

Second Embodiment

A memory system (memory-chaining system) in a second embodiment of the present invention will be described. The memory system (memory-chaining system) in the second embodiment is adapted to model 'memory-chaining' and 'emotion expression', which are psychological functions of the brain, by an artificial neural network structure.

The configuration of the memory-chaining system 100 in the second embodiment will be described with reference to FIG. 7.

Figure 7:
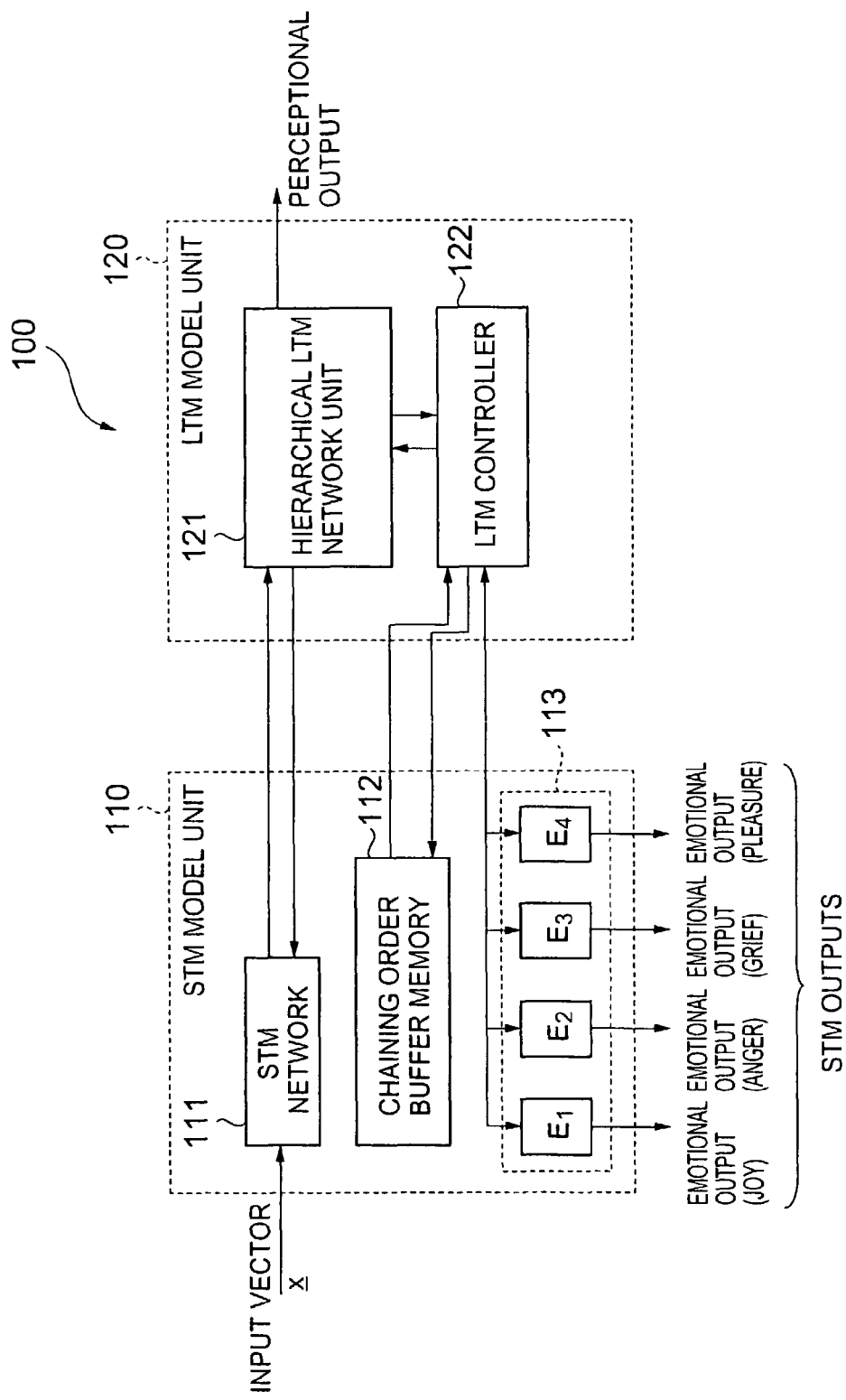
FIG. 7 is a block diagram of a memory system (memory-chaining system) in a second embodiment of the present invention.

Referring to FIG. 7, the memory-chaining system 100 in the second embodiment comprises an artificial neural network structure modeling 'memory-chaining' and 'emotion expression', i.e., psychological functions of the brain. The memory-chaining system 100 is a layered memory system including a short-term memory (STM) model unit 10 and a long-term memory (LTM) model unit 120.

<STM Model Unit>

The STM model unit 110 includes a STM network (short term memory network unit) 111 for temporarily storing an input vector given thereto from an external system and partly holding the state of the LTM model unit 120; a chaining order buffer memory 112 for temporarily holding chaining order of RBF elements in the LTM model unit 120; and an emotional value counter 113 for holding emotional values numerically representing the intensities of emotion. The STM network 111 uses a RBF neural network and the configuration thereof may be identical with that of the STM network 11 of the memory system 1 in the first embodiment. The chaining order buffer memory 112 and the emotional value counter 113 are used in combination with the LTM model unit 120, which will be described later.

The input vector given to the STM network 111 may be sensor information provided by a sensor or feature information extracted from the sensor information. The output of the STM network 111 is an input vector to be given to the LTM model unit 120. The information held by the STM network 111, the chaining order buffer memory 112 and the emotional value counter 113 can be given as a STM output to an external system. Particularly, when the output of the emotional value counter 113 is provided as a STM output, the same output can be directly used for controlling an artificial robot, which will be described later.

The chaining order buffer memory 112 and the emotional value counter 113 do not necessarily need to be included in the STM model unit 110, but the same may be included in the LTM model unit 120 or may be included in some unit other than the STM model unit 110 and the LTM model unit 120. However, since it is supposed that an 'awareness (attention)' function is realized by the STM network 111 (refer to the description of the first embodiment) and 'emotion' is regarded as one of the functions forming 'consciousness' in the field of cognitive science in the second embodiment (Ref. [28]), the emotional value counter 113 for realizing an emotion-expressing function is included in the STM model unit 110.

<LTM Model Unit>

The LTM model unit 120 has a hierarchical LTM network unit 121 that receives a plurality of input vectors from the STM network 111 of the STM model unit 110; and a LTM controller 122 that controls the hierarchical LTM network unit 121. The hierarchical LTM network unit 121 includes an artificial neural network structure including a plurality of RBF elements (neurons). The hierarchical LTM network unit 121 may be RBF neural networks and, preferably, are PNNs (probabilistic neural networks) (Ref. [29]) or GRNNs (generalized regression neural networks). The LTM controller 122 links the RBF elements of the hierarchical LTM network unit 121 to realize a 'memory-chaining' function, which will be described layer.

<Hierarchical LTM Network Unit>

The hierarchical LTM network unit 121 will be described with reference to FIGS. 8A and 8B.

Figure 8A:
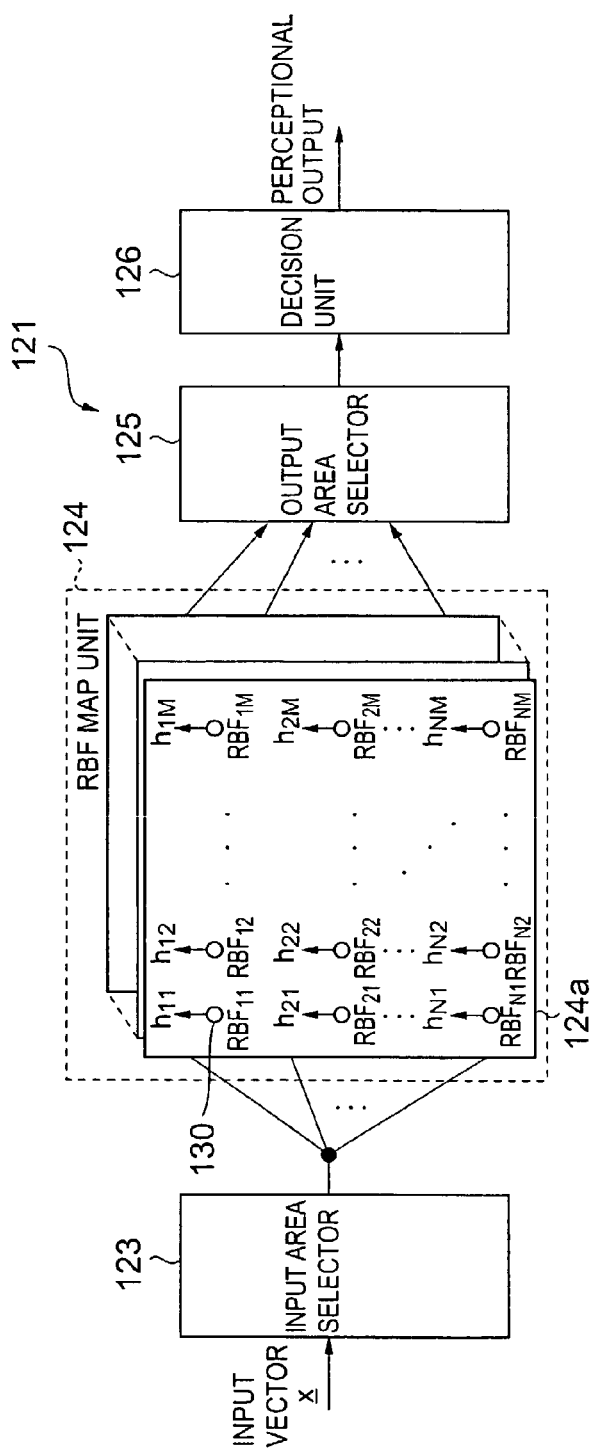
FIGS. 8A and 8B are diagrammatic views of assistance in explaining a hierarchical LTM network unit (long-term memory network unit) of a long-term memory model unit included in the memory-chaining system shown in FIG. 7.
Figure 8B:
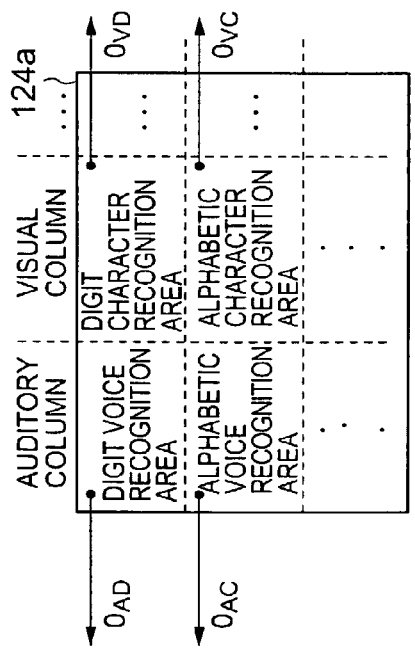

Referring to FIG. 8A, the hierarchical LTM network unit 121 has a RBF map unit (neuron map unit) 124 including a plurality of RBF elements 130 as neurons.

The RBF map unit 124 is formed by classifying the plurality of RBF elements 130 in layers by activation intensity, and has a plurality of RBF maps 124a of the layers.

The plurality of RBF elements 130 included in each of the RBF maps 124a of the RBF map unit 124 are classified into different areas according to the types of input vectors, such as types of perception, corresponding to the RBF elements 130. FIG. 8B illustrates such classification. In FIG. 8B, input vectors represent two perception types (auditory sensation and visual sensation), and the RBF map 124a is adapted to simultaneously achieve digit pattern recognition and character pattern recognition. As shown in FIG. 8B, the RBF map 124a includes four independent RBF neural networks respectively corresponding a digit voice recognition area, an alphabetic voice recognition area, a digit character recognition area and an alphabetic character recognition area.

As shown in FIG. 8A, an input area selector 123 and an output area selector 125 are connected to the RBF map unit 124 to select an area corresponding to an input vector from those included in the RBF map unit 124 and an area corresponding to an output from those included in the RBF map unit 124. More concretely, when an input vector representing, for example, a voice signal generated by a microphone, i.e., sensor information or information obtained by extracting features from sensor information, is given to the input area selector 123, the input area selector 123 gives the input vector to all the RBF elements 130 in an auditory column (FIG. 8B). Then, for example, if the input vector corresponds to one of digit voices, such as /zero/, /ichi (one)/, /ni (two)/, . . . , /kyu (nine)/, some of the RBF elements 130 in the digit voice recognition areas of the RBF map unit 124 is most highly activated. If the output area selector 125 is linked with the input area selector 123 to enable the output area selector 125 to select an area to which the input vector is given, an output can be provided only by a desired auditory column. The output thus obtained is given to a decision unit 126 for final pattern recognition. Since a total output $O_{AD}$ of the digit voice recognition areas is greater than a total output $O_{AC}$ of the alphabetic voice recognition areas in this example, it is known that the input vector (audio signal) is a digit voice. A digit can be identified through the comparison of all the outputs of the RBF elements 130 corresponding to the digit voices /zero/, . . . , /kyu (nine)/ in the digit voice recognition areas. Thus, the decision unit 126 is able to achieve final pattern recognition. The result of the final pattern recognition is given as a perceptional output to an external system.

<RBF Element>

The RBF element 130 included in the RBF map unit 124 of the hierarchical LTM network unit 121 will be described with reference to FIG. 9.

Figure 9:
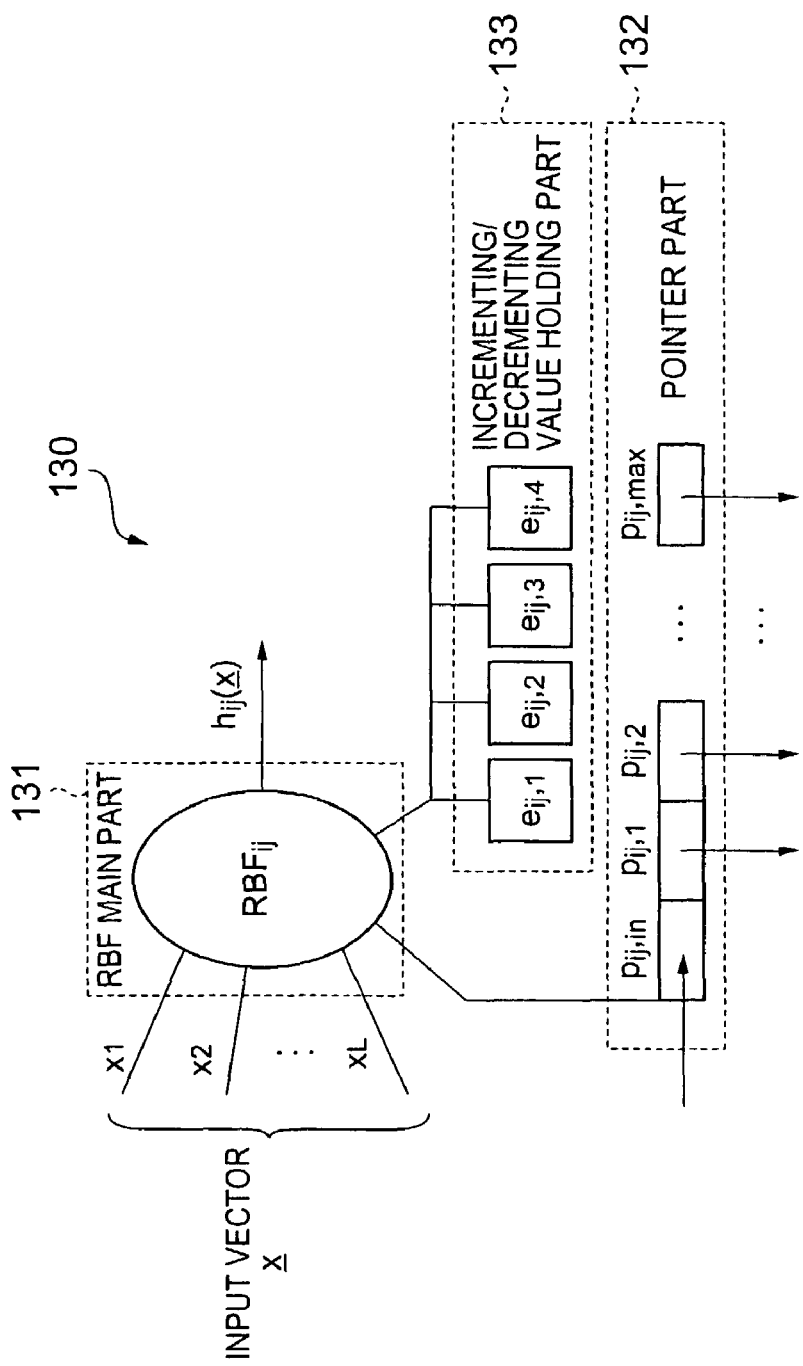
FIG. 9 is a block diagram of a RBF element (neuron) employed in the hierarchical LTM network unit shown in FIGS. 7, 8A and 8B.

Referring to FIG. 9, the RBF element 130 includes a RBF main part 131, a pointer part 132 and an incrementing/decrementing value holding part 133.

The RBF main part 131 provides an activation intensity corresponding to the similarity between an input vector and a centroid vector according to a radial-basis function (RBF). An activation intensity $h_{ij}(\underline{x})$ provided by the RBF main part 131 of the i,j-th RBF element 130 ($RBF_{ij}$) when an input vector $\underline{x}$ is given thereto is expressed by Expression (11).

$$h_{ij}(x) = \exp\left(-\frac{\|x - c_{ij}\|_2^2}{2\sigma_{ij}^2}\right) \quad (11)$$

where $c_{ij}$ is a centroid vector and $\sigma_{ij}$ is radius.

The RBF main part 131 has a configuration similar to that of an existing RBF and is used for constructing an artificial neural network structure having general-purpose abilities for realizing dynamic pattern recognition.

Figure 10:
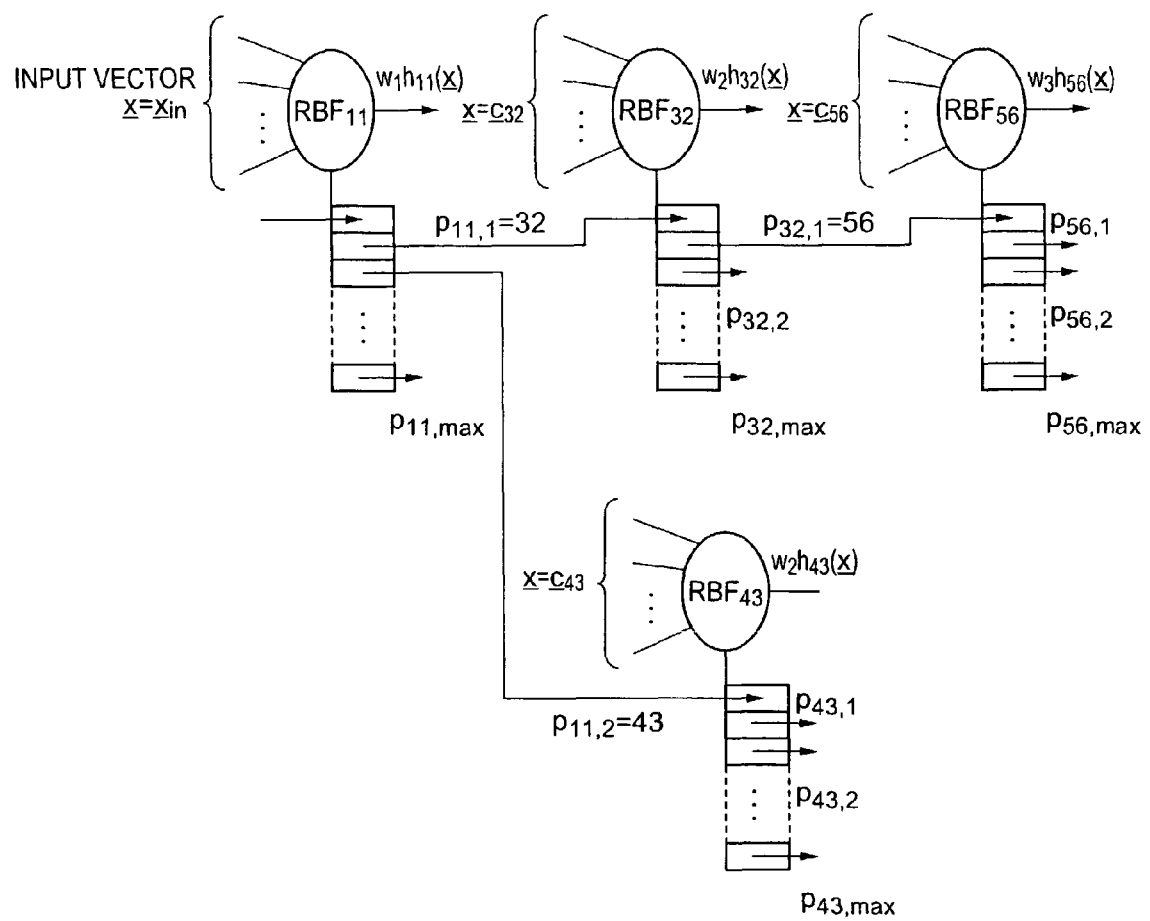
FIG. 10 is a typical view of assistance in explaining a method of realizing 'memory-chaining' by using the RBF elements shown in FIG. 9.

The pointer part 132 holds a plurality of pieces of pointer information about other related RBF elements and is used for realizing a 'memory-chaining' function. In FIG. 9, the addresses of the RBF elements to be subsequently chained are held in $p_{ij,1}$ to $p_{ij,max}$. Tree-mode memory-chaining can be realized by thus holding the plurality of pieces of pointer information by the pointer part 132 (FIG. 10). Thus, procedural memory and declarative memory, which are essential to realization of a thinking mechanism in addition to episodic memory.

The incrementing/decrementing value holding part 133 is a register that holds incrementing/decrementing values of emotional value to be added to the emotional value held by the emotional value counter 113 of the STM model unit 110, and are used for realizing emotion-expressing function. In FIG. 9, incrementing/decrementing values of emotional value $e_{ij,1}$ to $e_{ij,4}$ correspond to emotional values $E_1$ to $E_4$ held by the emotional value counter 113, respectively. The emotional values $E_1$ to $E_4$ held by the emotional value counter 113 correspond to emotions 'joy', 'anger', 'grief' and 'pleasure', respectively (Ref. [30]). Emotions are not limited to the foregoing four kinds of emotions.

The operation of the memory-chaining system 100 will be described.

In the memory-chaining system 100 shown in FIGS. 7 to 9, an artificial neural network structure having general-purpose abilities for realizing dynamic pattern recognition can be constructed by evolving the hierarchical LTM network unit 121 on the basis of input vectors. As mentioned in the description of the first embodiment, the RBF map unit 124 including the plurality of RBF maps 124a is constructed by constructing the layered LTM networks 2 to L according to the evolution process of a HA-GRNN (hierarchically arranged generalized regression neural network). LTM construction and learning of the hierarchical LTM network unit 121 of the LTM model unit 120 are performed.

In the process of the LTM construction and learning, operations for learning of the pointer parts 132 and the incrementing/decrementing value holding parts 133 of the RBF elements 130 included in the RBF map unit 124 are carried out simultaneously for learning to realize 'memory-chaining' and 'emotion expression'.

The following is an example of a sensor information processing procedure.

(a) A portrait of the late brother is shown to an intelligent robot. (→ Giving sensor information (or feature information extracted from sensor information)

(b) The intelligent robot recognizes that a person in the portrait is the brother. (→ Feature image recognition (1) (Perceptional information processing (1))

(c) The intelligent robot remembers the brother's voices. (→ Voice recognition (1) (Perceptional information processing (2)))

(d) The intelligent robot remembers the features of the brother's lover from the reminded brother's voices. (→ Feature image recognition (2) (Perceptional information processing (3))

It may safely be considered that the perceptional information processing steps (c) and (d) among the perceptional information processing steps (b) to (d) were derived from the perceptional information processing step (b) by a 'memory-chaining' function. Suppose that the perceptional information processing steps (b) to (d) are executed by the RBF elements $RBF_{11}$, $RBF_{32}$, and $RBF_{56}$. Then, memory-chaining of the perceptional information processing steps (b) to (d) can be expressed by Expression (12):

$$RBF_{11} \rightarrow RBF_{32} \rightarrow RBF_{56}, \quad (12)$$

where $RBF_{ij}$ denotes the RBF element on the line i and the column j of the RBF map 124a of RBF map unit 124. $RBF_{11}$ denotes the RBF element in a feature image recognition area (visual column) most activated to the brother's feature; $RBF_{32}$ denotes the RBF element in a voice recognition area (auditory column) most activated to the brother's voice; and $RBF_{56}$ denotes the RBF element in a feature recognition area (visual column) most activated to the feature of the brother's lover.

<Memory-Chaining Learning>

A memory-chaining learning process will be described in connection with the foregoing series of perceptional information processing steps by way of example. In the memory-chaining procedure, the hierarchical LTM network unit 121 is controlled by the LTM controller 122. Pointer information is set in the pointer parts 132 of the RBF elements 130 on the basis of order of the RBF elements 130 added or activated in a time series mode in connection with a plurality of input vectors given to the hierarchical LTM network unit 121.

More concretely, as shown in FIG. 10, during the construction of the hierarchical LTM network unit 121, the $RBF_{11}$ is added to the RBF map unit 124 at time $t_1$, and then the $RBF_{32}$ is added to the RBF map unit 124 at time $t_2$. Then, the pointer $p_{11,1}$ of the $RBF_{11}$ added to the RBF map unit 124 at time $t_1$ is set to "32" indicating the address of the $RBF_{32}$ added to the RBF map unit 124 next to the $RBF_{11}$. When the $RBF_{56}$ is added similarly to the RBF map unit 124 at time $t_3$, the pointer $p_{32,1}$ is set to "56" indicating the address of the $RBF_{56}$ added to the RBF map unit 124 next to the $RBF_{32}$.

Referring to FIG. 10, suppose that the $RBF_{11}$ is activated again and another $RBF_{43}$, for example, is activated following the $RBF_{11}$ during the learning process or the reconstructing process of the hierarchical LTM network unit 121. Then, the second pointer $P_{11,2}$ of the $RBF_{11}$ is set to "43" indicating the address of the $RBF_{43}$ activated following the $RBF_{11}$.

In the memory-chaining learning process, it is preferable to avoid pointer information setting that forms a closed loop by the RBF elements, such as $p_{11,2}=43$ and $p_{43,1}=11$.

<Emotion Expression Learning>

An emotion expression learning process will be described. In the emotion expression learning process, the LTM controller 122 controls the hierarchical LTM network unit 121. Incrementing/decrementing values of emotional value $e_1$ to $e_4$ are set in the incrementing/decrementing value holding part 133 of the RBF element 130 on the basis of emotional values $E_1$ to $E_4$ held by the emotional value counter 113 when the RBF element 130 is added in connection with an input vector given to the hierarchical LTM network unit 121.

More concretely, when the $RBF_{ij}$ are added to the RBF map unit 124 during the construction of the hierarchical LTM network unit 121, incrementing/decrementing values of emotional value $e_{ij,1}$ to $e_{ij,4}$ for the $RBF_{ij}$ are initialized to values based on the emotional values $E_1$ to $E_4$ held by the emotional value counter 113, such as $\{-1, 0, 1\}$. The incrementing/decrementing values of emotional value $e_{ij,1}$ to $e_{ij,4}$ for the $RBF_{ij}$ may be entered by the operator.

When the $RBF_{ij}$ are accessed again during while the hierarchical LTM network unit 121 is in the learning process or the reconstructing process, the incrementing/decrementing values of emotional value $e_{ij,1}$ to $e_{ij,4}$ for the $RBF_{ij}$ are updated by using Expression (13).

$$e_{ij,k} = (1-\lambda)e_{ij,k} + \lambda \cdot \text{sign}(E_k), \quad (13)$$

where $\lambda$ is an arbitrary constant meeting $0 \leq \lambda \leq 1$.

<Realization of 'Memory-Chaining'>

The hierarchical LTM network unit 121, in which learning of 'memory-chaining' and 'emotion expression' has thus been completed, realizes 'memory-chaining' and 'emotion expression' in the following manner.

A memory-chaining realizing process will be explained in connection with the perceptional information processing steps (a) to (d) by way of example with reference to FIGS. 10 and 11. In the memory-chaining realizing process, the LTM controller 122 controls the hierarchical LTM network unit 121. The plurality of mutually related RBF elements 130 are followed successively by using the pointer parts 132 of the RBF elements 130 of the hierarchical LTM network unit 121 to store 'chaining order of the plurality of RBF elements' in the chaining order buffer memory 112.

Suppose that the pointer $p_{11,1}$ of the $RBF_{11}$ indicates the $RBF_{32}$, and the pointer $p_{32,1}$ of the $RBF_{32}$ indicates the $RBF_{56}$ in the RBF map unit 124 as shown in FIG. 10.

Figure 11:
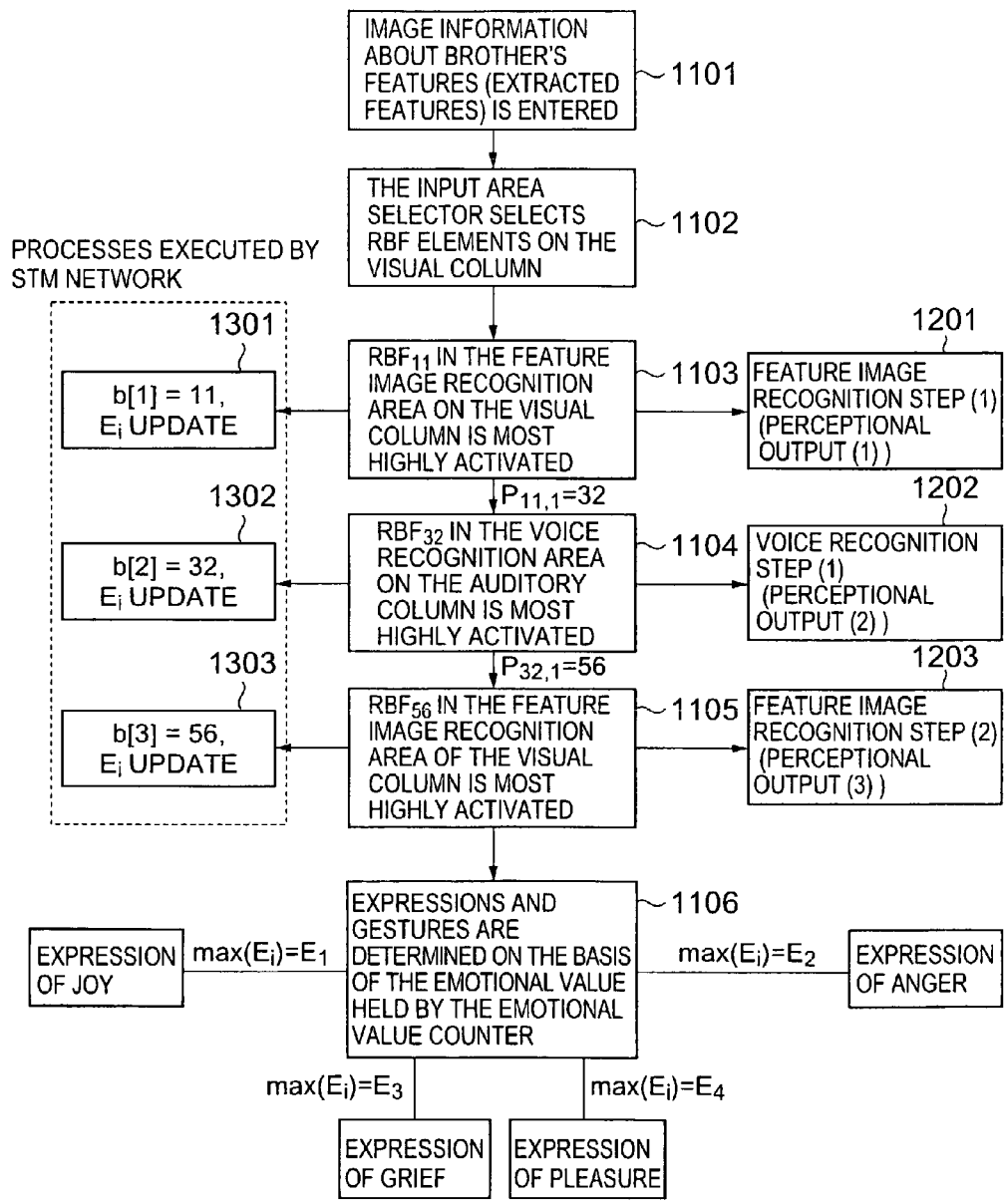
FIG. 11 is a flow chart of assistance in explaining a method of realizing 'memory-chaining' and 'emotion expression' in the memory-chaining system shown in FIGS. 7 to 9.

Then, as shown in FIG. 11, an input vector representing feature information extracted from 'information about brother's features' is given through the STM network 111 of the STM model unit 110 to the hierarchical LTM network unit 121 of the LTM model unit 120 in step 1101. The input area selector 123 of the hierarchical LTM network unit 121 selects a visual column from the plurality of areas included in the RBF map unit 124, and the input vector is given to all the RBF elements 130 on the selected visual column in step 1102.

In the RBF map unit 124, the $RBF_{11}$ in a feature image recognition area of the visual column, i.e., the RBF element that excites most intensely at the brother's feature, is most highly activated in step 1103. Then, the $RBF_{32}$ in a voice recognition area on the auditory column, i.e., the RBF elements that excites most intensely at the brother's voice, indicated by the pointer $p_{11,1}=32$ of the most highly activated $RBF_{11}$, is most highly activated in step 1104. The $RBF_{56}$ in the feature image recognition area of the visual column, i.e., the RBF element that excites most intensely at the features of the brother's lover, indicated by the pointer $p_{32,1}=56$ of the thus most highly activated $RBF_{32}$, is most highly activated in step 1105. A series of perceptional information processing steps (the feature image recognition step (1), the voice recognition step (1) and the feature image recognition step (2)) are executed while the $RBF_{11}$, the $RBF_{32}$ and the $RBF_{56}$ are activated successively (steps 1201 to 1203). Chaining order of the RBF elements is stored in the one-dimensional buffer memories b[ ] of the chaining order buffer memory 112 of the LTM model unit 120, such that b[1]=11, b[2]=32 and b[3]=56 (steps 1301 to 1303).

As shown in FIG. 10, in the RBF map unit 124, when the plurality of RBF elements (the $RBF_{32}$ and the $RBF_{43}$ in this example) are indicated by the $RBF_{11}$ and, for example, the $RBF_{11}$ is activated first, the RBF element having incrementing/decrementing values of emotional value $e_{ij,1}$ to $e_{ij,4}$ nearest to values based on the emotional values $E_1$ to $E_4$ of the emotional value counter 113 is chained next. For example, when the emotional value counter 113 holds emotional values $E_1=-2$, $E_2=1$, $E_3=3$ and $E_4=-3$, and incrementing/decrementing values of emotional value for the $RBF_{32}$ and $RBF_{43}$, i.e., candidates for chaining, are "$e_{32,1}=-1$, $e_{32,2}=1$, $e_{32,3}=1$, $e_{32,4}=1$" and "$e_{43,1}=1$, $e_{43,2}=-1$, $e_{43,3}=-1$, $e_{43,4}=1$", respectively, the incrementing/decrementing values of emotional value $e_{32,1}$ to $e_{32,4}$ of the $RBF_{32}$ are closer to the emotional values $E_1$ to $E_4$ than the incrementing/decrementing values of emotional value $e_{43,1}$ to $e_{43,4}$ of the $RBF_{43}$. In such a case, the $RBF_{32}$ is selected as a RBF element to be chained next. When the memory-chaining system 100 in the second embodiment is incorporated into an intelligent robot, the perceptional information processing procedure of the intelligent robot can be controlled according to the current emotional state of the intelligent robot by using the aforesaid characteristic, so that the intelligent robot is expected to perform complicated actions similar to those of a human. When the memory-chaining system 100 in the second embodiment is applied to the analysis of thinking mechanism, it is possible to prepare some scenarios of situations beforehand, and to analyze the last selected scenario on the basis of results stored in the chaining order buffer memory 112.

In the memory-chaining realizing process shown in FIG. 10, the $RBF_{32}$ is activated next to the $RBF_{11}$ or the $RBF_{56}$ is activated next to the $RBF_{32}$, input vectors given to the $RBF_{32}$ and the $RBF_{56}$ are the same as a centroid vector $c_{32}$ held by the $RBF_{32}$ or a centroid vector $c_{56}$ held by the $RBF_{56}$.

In the memory-chaining realizing process shown in FIG. 10, the intensity of activation may be adjusted by multiplying the respective outputs of the RBF elements ($RBF_{11}$, $RBF_{32}$ and $RBF_{56}$) by different weighting coefficients $w_i$ ($i=1, 2, \ldots$), respectively. In such a case, a phenomenon of forgetfulness can be realized by calculating the weighting coefficients $w_i$ using Expression (14):

$$w_i = \exp(-\alpha i), \tag{14}$$

where $\alpha > 0$.

<Realization of 'Emotion Expression'>

An emotion expression realizing process accompanying the foregoing 'memory-chaining' will be described. In the emotion expression realizing process, the incrementing/decrementing values of emotional value held by the incrementing/decrementing value holding parts 133 of the RBF elements 130 are added to the emotional values held by the emotional value counter 113 when the plurality of mutually related RBF elements 130 are followed successively by using the pointer parts 132 of the RBF elements 130 of the hierarchical LTM network unit 121.

Suppose that the initial values of the emotional values $E_1$ to $E_4$ held by the emotional value counter 113 of the STM model unit 110 are zero indicating a neutral state. Suppose also that the incrementing/decrementing values of emotional value $e_{11,i}$, $e_{32,i}$ $e_{56,i}$ ($i=1$ to 4) for the $RBF_{11}$, $RBF_{32}$ and $RBF_{56}$ are determined by the foregoing learning process.

When the $RBF_{11}$, $RBF_{32}$ and $RBF_{56}$ are activated successively as shown in FIG. 11, a series of the perceptional information processing steps (the feature image recognition (1), the voice recognition (1) and feature image recognition (2)) is executed by the $RBF_{11}$, $RBF_{32}$ and $RBF_{56}$ respectively (steps 1201 to 1203), and the incrementing/decrementing values of emotional value $e_{11,i}$, $e_{32,i}$ and $e_{56,i}$ ($i=1$ to 4) for the $RBF_{11}$, $RBF_{32}$ and $RBF_{56}$ are added to the emotional values $E_i$ ($i=1$ to 4) held by the emotional value counter 113 to update the emotional values $E_i$ successively (steps 1301 to 1303).

Consequently, the emotional values $E_i$ held by the emotional value counter 113 are updated using Expression (15).

$$E_i = E_i + e_{11,i} + e_{32,i} + e_{56,i} \tag{15}$$

($i=1$ to 4)

When the output of the emotional value counter 113 is used as STM output, the expressions and gestures of an intelligent robot, such as AIBO® (SONY), i.e., a pet robot, can be controlled on the basis of the emotional values $E_1$ to $E_4$ held by the emotional value counter 113 (step 1106). More concretely, the intelligent robot expresses 'joy' when the emotional value $E_1$ is the greatest among the emotional values $E_1$ to $E_4$, 'anger' when the emotional value $E_2$ is the greatest, 'grief' when the emotional value $E_3$ is the greatest, and 'pleasure' when the emotional value $E_4$ is the greatest.

<Emotional Value Counter Control Method>

The 'memory-chaining' and 'emotion expression' functions are thus realized. The emotional values $E_1$ to $E_4$ set during the realization of the 'emotion expression' in the emotional value counter 113 of the STM model unit 120 significantly concern the actual control of the intelligent robot or the like. Therefore it is often necessary to limit the range of the emotional values $E_1$ to $E_4$ in order that the intelligent robot can be smoothly controlled.

Accordingly, in the memory-chaining system 100 in the second embodiment, the LTM controller 122 of the LTM model unit 110 retrieves the RBF elements 130 that make the emotional values $E_1$ to $E_4$ held by the emotional value counter 113 meet a predetermine condition after the completion of memory-chaining and emotion expression, to keep the emotional values $E_1$ to $E_4$ within a predetermined range. Such a control method is supposed to be applied to cases, namely, (1) a case where actual actions (processes) are performed and (2) a case where imaginary actions (processes) ('thinking') are supposed. In the case (2), since the emotional value counter 113 performs the addition merely temporarily, new imaginary emotional values $E_1'$ to $E_4'$ are prepared, and initial values $E_i'$ are set equal to $E_i$ ($i=1$ to 4).

Figure 12:
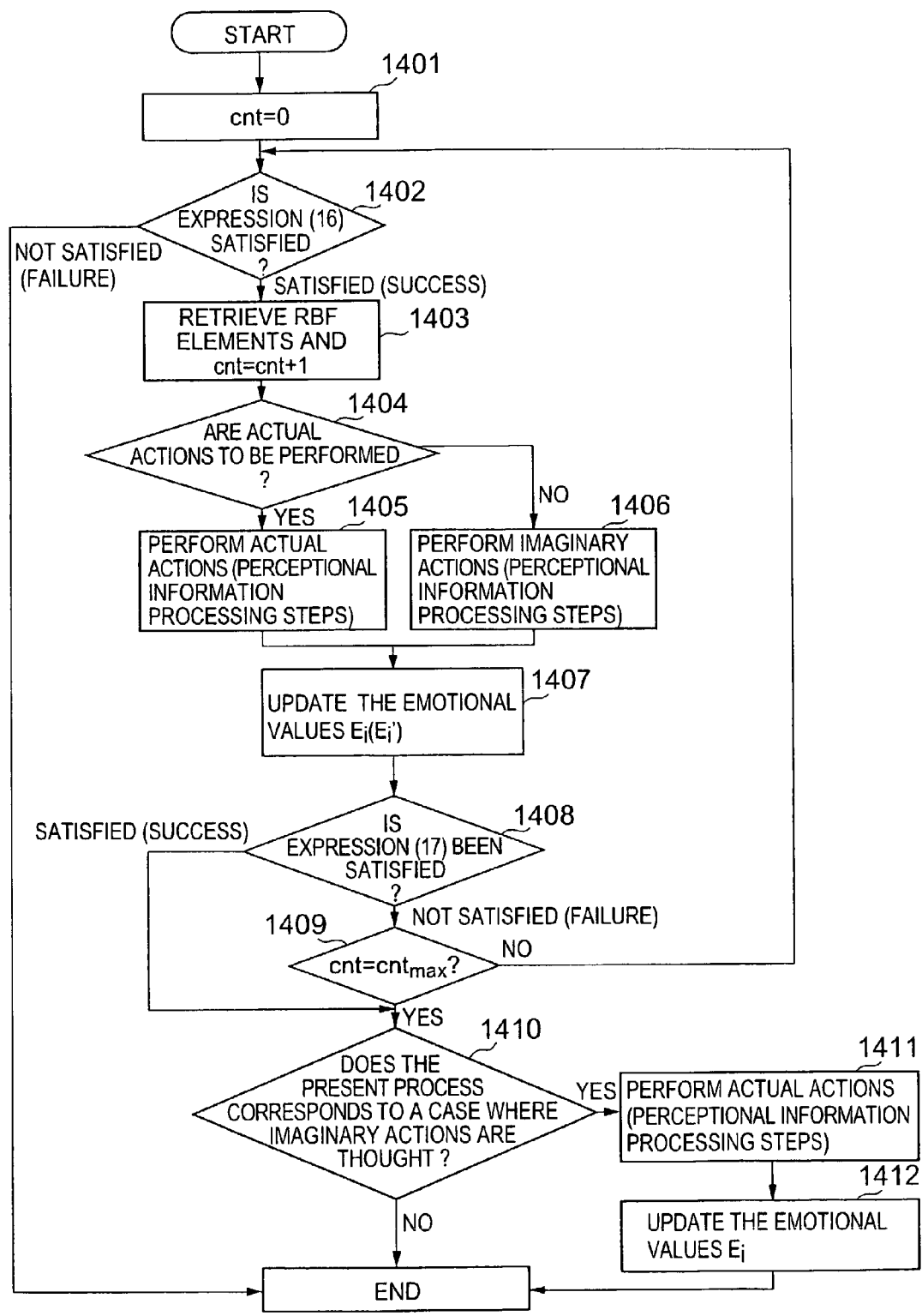
FIG. 12 is a flow chart of assistance in explaining a method of controlling an emotional value counter included in the memory-chaining system shown in FIGS. 7 to 9.

A control procedure for controlling the emotional value counter 113 will be described with reference to FIG. 12. Retrieval cycle count cnt is set to "0" in step 1401, and then a query is made in step 1402 to see if the emotional values $E_i$ ($E_i'$) ($i=1$ to 4) meet a condition expressed by Expression (16).

$$E_{min} < E_i(E_i') \leq E_{max} \tag{16}$$

If the emotional values $E_i$ ($E_i'$) do not satisfy Expression (16), the control procedure is ended. If the emotional values $E_i$ ($E_i'$) satisfy Expression (16), the RBF elements are retrieved and the retrieval count cnt is incremented by one in step 1403. The retrieval of the RBF elements is continued until the retrieval count cnt reaches a maximum retrieval count $cnt_{max}$ and the condition expressed by Expression (16) is satisfied, which means that the control function is effective while the emotional values $E_i$ ($E_i'$) are within the predetermined range, and an effort to control the emotional values $E_i(E_i')$ is discontinued.

After one of the RBF elements has been retrieved in step 1403, a query is made in step 1404 to see if actual actions are to be performed.

If actual actions are performed, actions, such as perceptional information processing steps, are performed in step 1405, and then step 1407 is executed. If imaginary actions are performed, imaginary actions, such as perceptional information processing steps, are performed in step 1406 and then step 1407 is executed.

In step 1407, the emotional values $E_i$ ($E_i'$) held by the emotional value counter 113 are updated, and a query is made in step 1408 to see if Expression (17) is satisfied.

$$\text{minimize} \sum_{i=1}^{4} d_i, \quad (17)$$

(1) case where actual actions are performed:
$d_1=|E_1-a_1|, d_2=|E_2|, d_3=|E_3|, d_4=|E_4-a_4|$;

(2) case where imaginary actions are thought:
$d_1=|E_1'-a_1|, d_2=|E_2'|, d_3=|E_3'|, d_4=|E_4'-a_4|$; $0<a_1, a_4<b$, b is an arbitrary positive constant.

Expression (17) is used for confirming that the sum of the absolute values of $d_1$ to $d_4$ defined as mentioned above is very close to zero, i.e., in the range of 0±(Set value). This means the retrieval of a RBF element that makes the emotional value $E_1$ representing 'joy' and the emotional value $E_4$ representing 'pleasure' close to the positive values $a_1$ and $a_4$, respectively, and makes the emotional value $E_2$ representing 'anger' and the emotional value $E_3$ representing 'grief' close to zero.

If the response in step 1408 is affirmative, i.e., if the condition expressed by Expression (17) is satisfied, a query is made in step 1410 to see if the present process corresponds to a case where imaginary actions are thought. If the response in step 1410 is negative, i.e., if the condition corresponds to a case where actual actions are performed, the control procedure is ended. If the condition corresponds to a case where imaginary actions are thought, the intelligent robot performs actual actions (perceptional information processing steps) accompanying the last retrieved RBF element collectively in step 1411. The emotional values $E_1$ to $E_4$ held by the emotional value counter 113 are updated in step 1412 and the control procedure is ended.

If the response in step 1408 is negative, i.e., if the condition expressed by Expression (17) is not satisfied, steps 1402 to 1409 are repeated until the retrieval cycle count cnt coincides with the maximum retrieval cycle count $cnt_{max}$.

Suppose, by way of example, that the emotional value $E_3$ corresponding to 'grief' among the emotional values $E_1$ to $E_4$ held by the emotional value counter 113 of the STM model unit 110 became the greatest after the execution of the series of perceptional information processing steps shown in FIG. 11. In this case, a RBF element that increases the emotional value $E_1$ corresponding to 'joy' and the emotional value $E_4$ corresponding to 'pleasure', and reduces the emotional value $E_3$ corresponding to 'grief' is retrieved from the RBF map unit 124 according to the condition expressed by Expression (17) to control the emotional value $E_3$ corresponding to 'grief'. The RBF element can be highly activated when the intelligent robot spontaneously performs an action or makes something else perform an action to prompt the entry of a condition corresponding to the retrieved RBF element or sensor information; that is, the RBF element can be highly activated by giving an input vector close to the centroid vector of the RBF element to the intelligent robot. Eventually, the emotional values $E_1$ to $E_4$ held by the emotional value counter 113 approach values meeting the condition expressed by Expression (17), i.e., $E_1=a_1, E_2=0, E_3=0$ and $E_4=a_4$.

The retrieval of the RBF element in the emotional value counter control method is performed by a trial-and-error method that makes a query to see if the condition expressed by Expression (17) is satisfied. The range of retrieval may be limited on the basis of the condition of the STM network 111 of the STM model unit 110.

When the condition of the comparatively highly activated RBF element 130 among the RBF elements 130 of the hierarchical LTM network unit 121 is held partly in the STM network 111 of the STM model unit 110, the STM network 111 is able to express a current 'awareness' states represented by an 'attention' function. Therefore, when the range of retrieval is determined for the searching operation of the LTM controller 122 to retrieve the aforesaid RBF element on the basis of the condition of the RBF elements held by the STM network 111, a retrieval operation to retrieve a RBF element is performed in a range focused by the STM network 111, so that the efficiency of the retrieval operation can be improved. For example, if the focus by the STM network 111 is directed particularly to an input vector representing sensor information related with an image of the brother's features, i.e., if the number of RBF elements connected with an image of the brother's features is greater than those of the rest of the RBF elements in the STM network 111, the retrieval operation for retrieving a RBF elements to control the emotional value counter 113 is started with a RBF element closely associated with the image of the brother's features. However, since the focus of the STM network 111 changes continually according to successively entered pieces of sensor information (input vectors), it is possible that the mode of retrieval is changed greatly by sensor information other than the image of the brother's features. Therefore, it is desirable to retrieve a RBF element for controlling the emotional value counter 113 by the method of "retrieving a RBF element that corresponds to an object similar to an object currently focused by the STM network, and that has incrementing/decrementing values of emotional value meeting the condition expressed by Expression (17)". More concretely, in relation with the image of the features of the late brother, by way of example, if a RBF element corresponding to the image of the features of the living parent, brother or sister of the late brother meets the condition expressed by Expression (17), the same RBF element may be retrieved by the emotional value counter control method.

The memory-chaining system in the second embodiment has the hierarchical LTM network unit 121 including the artificial neural network structure including the plurality of RBF elements 130, and controls the RBF element 130 (the RBF element 130 having the RBF main part 131 that provides an intensity of activation corresponding to the similarity between an input vector and a centroid vector and a pointer part 132 that holds pointer information about the mutually related other RBF elements) by the LTM controller 122 to realize the 'memory-chaining' function. Thus, the learning of memory-chaining can be achieved in a comparatively short time and the 'memory-chaining' function can be easily realized. Since the number of parameters having a high degree of freedom is small, necessary hardware can be comparatively easily realized.

In the memory-chaining system in the second embodiment, each RBF element 130 includes the incrementing/decrementing value holding part 133, and the current emotional values are determined by adding, to the emotional values held by the emotional value counter 113, the incrementing/decrementing values of emotional value of the RBF element 130 followed during memory-chaining. Therefore, precise 'emotion expression' can be achieved by using 'memory-chaining'.

The memory-chaining system 100 in the second embodiment is highly flexible and versatile, and, as mentioned above, the memory-chaining system 100 is applicable to emotion-expressing mechanisms, such as intelligent robots. More concretely, when some key stimulus is given as sensor information to an intelligent robot, the intelligent robot achieves 'memory-chaining' by using a RBF map formed on the basis of experiments of the intelligent robot, and emotional values corresponding to memory-chaining are set during the process of memory-chaining. Thus, the intelligent robot or the like are able to express emotions easily and precisely. Since the process of memory-chaining carried out by the intelligent robot can be traced and analyzed by a human, materials for final decision for a human are provided and hence a diagnostic system or the like adapted to make a more human, precise decision can be constructed. It is expected that more human sentences can be composed by applying the memory-chaining system 100 in the second embodiment to lexical analysis.

The memory-chaining system 100 in the second embodiment can be realized in hardware by a method that arranges the RBF elements (neurons) 130 in a programmable array or can be realized in software that is executed by, for example, the computer system 40 shown in FIG. 13. The computer system 40 includes the processor 41, the memory 42, the hard disk 43, and peripheral devices including the input device 44 including a keyboard and a mouse, the output device 45 including a display and a printer, the FD drive 46, the CD-ROM drive 47, and the bus 48 interconnecting those component devices. The program is stored in a recording medium from which the computer is able to read data, such as the memory 42, the hard disk 43, the FD 49 or the CD-ROM 50; and the processor 41 reads instructions included in the program sequentially from the recording medium, and executes the instructions to carry out the foregoing procedures.

REFERENCES

[1] G. Matsumoto, Y. Shigematsu, and M. Ichikawa, "The brain as a computer," in Proc. Int. Conf. Brain Processes, Theories and Models, MIT Press: Cambridge, Mass., 1995.

[2] I. Aleksander, "Impossible minds: my neurons, my consciousness," Imperial College Press, 1996.

[3] R. A. Brooks, "From earwigs to humans," Proc. Int. Symp., "Concept formation, thinking, and their development," Int. Inst. Advanced Studies, Kyoto, 1996.

[4] R. A. Brooks, "A robust layered control system for a mobile robot," IEEE J. Robotics and Automation, RA-2-1, pp. 14-23, 1986.

[5] T. Kitamura, Y. Otsuka, and Y. Nakao, "Imitation of animal behavior with use of a model of consciousness—behavior relation for a small robot," Proc. 4th IEEE Int. Workshop on Robot and Human Communication, pp. 313-316, Tokyo, 1995.

[6] D. F. Specht, "A general regression neural network," IEEE Trans. Neural Networks, Vol. 2, No. 6, pp. 568-576, November, 1991.

[7] S. Haykin, "Neural networks: a comprehensive foundation," Macmillan College Publishing Co. Inc., 1994.

[8] T. Hoya and J. A. Chambers, "Heuristic pattern correction scheme using adaptively trained generalized regression neural networks," IEEE Trans. Neural Networks, Vol. 12, No. 1, pp. 91-100, January 2001.

[9] R. C. Atkinson and R. M. Shiffrin, "Human memory: a proposed system and its control processes," in K. W. Spence and J. T. Spence (Eds.), The Psychology of Learning and Motivation, Vol. 2, pp. 89-195, New York: Academic Press, 1968.

[10] D. A. Reynold and R. C. Rose, "Robust text-independent speaker identification using Gaussian mixture speaker models," IEEE Trans. Speech and Audio Processing, Vol. 3, No. 1, January 1995.

[11] V. Vapnik, "The nature of statistical learning theory," Springer Verlag, New York, 1995.

[12] Papers in the proceedings of IEEE International Workshop on Neural Networks for Signal Processing.

[13] P. D. Wasserman, "Advanced methods in neural computing—in Chapter 8, Radial-basis function networks," pp. 147-176, Van Nostrand Reinhold, New York, 1993.

[14] J. G. Taylor, B. Horwitz, N. J. Shah, W. A. Fellenz, H. W. Mueller-Gaertner, and J. B. Krause, "Decomposing memory: functional assignments and brain traffic in paired word associate learning," Neural Networks, Vol. 13, No. 8-9, pp. 923-940, October/November 2000.

[15] M. S. Gazzaniga, R. B. Irvy, and G. R. Mangun, "Cognitive neuroscience—the biology of the mind: Chapter 7: memory systems," W. W. Norton Y& Company, New York/London, 1998.

[16] O. Hikosaka, S. Miyachi, K. Miyashita, and M. K. Rand, "Procedural learning in monkeys—possible roles of the basal ganglia," in "Perception, memory and emotion: frontiers in neuroscience," pp. 403-420, eds. T. Ono, B. L. McNaughton, S. Molotchnikoff, E. T. Rolls, and H. Nishijo, Elsevier, 1996.

[17] Y. Shigematsu, M. Ichikawa, and G. Matsumoto, "Reconstitution studies on brain computing with the neural network engineering," in "Perception, memory and emotion: frontiers in neuroscience," pp. 581-599, eds. T. Ono, B. L. McNaughton, S. Molotchnikoff, E. T. Rolls, and H. Nishijo, Elsevier, 1996.

[18] L. R. Squire, "Memory and brain," Oxford Univ. Press, New York/Oxford, 1987.

[19] M. Minsky, "Emotions and the Society of Mind," in Emotions and Psychopathology, Manfred Clynes and Jack Panksepp, eds., Plenum Press, N.Y., 1988.

[20] C. I. Hovland, "Human learning and retention," in: Handbook of experimental psychology, pp. 613-689, S. S. Stevens (ed.), John Wiley, 1951.

[21] P. A. Kolers, "Reading a year later," J. Exp. Psychol.: Human learn. and memory, Vol. 2, pp. 554-565, 1976.

[22] Sir J. Eccles, "Evolution of consciousness," in "Brain mechanisms of perception and memory: from neuron to behavior," eds. T. Ono, L. R. Squire, M. E. Raichle, D. I. Perrett, and M. Fukuda, Oxford Univ. Press, 1993.

[23] M. Jibu and K. Yasue, "Quantum brain dynamics and consciousness: an introduction," John Benjamins, Amsterdam, 1995.

[24] N. Matsumoto, "The brain and biophysics," Kyo-ritsu Shuppan Press, 1997 (in Japanese).

[25] M. Huckvale, "Speech Filing System Vs3.0—Computer Tools For Speech Research," University College London, March 1996.

[26] J. R. Deller Jr, J. G. Proakis, and J. H. L. Hansen, "Discrete-Time Processing of Speech Signals," Macmillan, N.J., 1993.

[27] J. B. MacQueen, "Some Methods for Classification and Analysis of Multivariate Observations," in Proc. Symp. Matho. Stat. Prob., 5th ed. Berkeley, Calif.: Univ. of Calif. Press, Vol. 1, pp. 281-297, 1967.

[28] J. A. Hobson, Consciousness, translated in Japanese by T. Mizoguchi, with the subtitle, Consciousness and Brain, Nikkei-Science, vol. 134, 1999.

[29] D. F. Specht, "Probabilistic neural networks," Neural Networks, vol. 3, pp. 109-118, 1990.

[30] M. Toda, "Kanjo (Emotion)," Ninchi-Kagaku-Sensho 24, University of Tokyo Press, 1992.

What is claimed is:

1. A computer readable medium having stored thereon a memory-chaining system having an artificial neural network structure modeling memory-chaining functions of a brain, comprising:
   a long-term memory network unit using an artificial neural network structure including a plurality of neurons; and
   a network control unit that connects the neurons of the long-term memory network unit with each other to realize a memory-chaining function;
   wherein each of the neurons of the long-term memory network unit has a radial-basis function main part that provides an activation intensity corresponding to similarity between an input vector and a centroid vector according to a radial-basis function; and
   a pointer part that holds pointer information about a mutually related other neuron,
   wherein the neurons of the long-term memory network unit are classified hierarchically by activation degree, and
   wherein the long-term memory network unit includes a neuron map part formed by assigning the plurality of neurons to different areas according to types of input vectors relevant to the neurons; an input area selector that selects an area relevant to an input vector from the plurality of areas included in the neuron map part; and an output area selector that selects an area to be outputted, from the plurality of areas included in the neuron map part.

2. A computer readable medium having stored thereon a memory-chaining system having an artificial neural network structure modeling memory-chaining functions of a brain, comprising:
   a long-term memory network unit using an artificial neural network structure including a plurality of neurons; and
   a network control unit that connects the neurons of the long-term memory network unit with each other to realize a memory-chaining function;
   wherein each of the neurons of the long-term memory network unit has a radial-basis function main part that provides an activation intensity corresponding to similarity between an input vector and a centroid vector according to a radial-basis function; and
   a pointer part that holds pointer information about a mutually related other neuron,
   wherein the neurons of the long-term memory network unit are classified hierarchically by activation degree, and
   wherein the network control unit sets pointer information in a pointer part of each neuron on the basis of order of neurons added or activated in a time series in connection with a plurality of input vectors given to the long-term memory network unit.

3. A computer readable medium having stored thereon a memory-chaining system having an artificial neural network structure modeling memory-chaining functions of a brain, comprising:
   a long-term memory network unit using an artificial neural network structure including a plurality of neurons; and
   a network control unit that connects the neurons of the long-term memory network unit with each other to realize a memory-chaining function;
   wherein each of the neurons of the long-term memory network unit has a radial-basis function main part that provides an activation intensity corresponding to similarity between an input vector and a centroid vector according to a radial-basis function; and
   a pointer part that holds pointer information about a mutually related other neuron,
   wherein the neurons of the long-term memory network unit are classified hierarchically by activation degree, and
   wherein the network control unit stores order of chaining of a plurality of mutually related neurons in a chaining order buffer memory, while sequentially following the plurality of mutually related neurons by using the pointer part of each neuron of the long-term memory network unit.

4. A computer readable medium having stored thereon a memory-chaining system having an artificial neural network structure modeling memory-chaining functions of a brain, comprising:
   a long-term memory network unit using an artificial neural network structure including a plurality of neurons; and
   a network control unit that connects the neurons of the long-term memory network unit with each other to realize a memory-chaining function;
   wherein each of the neurons of the long-term memory network unit has a radial-basis function main part that provides an activation intensity corresponding to similarity between an input vector and a centroid vector according to a radial-basis function; and
   a pointer part that holds pointer information about a mutually related other neuron,
   wherein the neurons of the long-term memory network unit are classified hierarchically by activation degree, and
   wherein the network control unit causes the long-term memory network unit to multiply outputs of the neurons respectively by different weighting coefficients when a plurality of mutually related neurons are followed sequentially by using the pointer part of each neuron of the long-term memory network unit.

5. A computer readable medium having stored thereon a memory-chaining system having an artificial neural network structure modeling memory-chaining functions of a brain, comprising:
   a long-term memory network unit using an artificial neural network structure including a plurality of neurons; and
   a network control unit that connects the neurons of the long-term memory network unit with each other to realize a memory-chaining function;
   wherein each of the neurons of the long-term memory network unit has a radial-basis function main part that provides an activation intensity corresponding to similarity between an input vector and a centroid vector according to a radial-basis function; and
   a pointer part that holds pointer information about a mutually related other neuron,
   wherein the neurons of the long-term memory network unit are classified hierarchically by activation degree, and
   further comprising an emotional value counter that holds an emotional value numerically representing an intensity of emotion;
   wherein each neuron of the long-term memory network unit has an incrementing/decrementing value holding part that holds an incrementing/decrementing value of emotional value to be added to the emotional value held by the emotional value counter.

6. The computer readable medium according to claim 5, wherein the emotional value counter holds a plurality of types of emotional values for each of emotion types; and the incrementing/decrementing value holding part of each neuron of the long-term memory network unit holds a plurality of incrementing/decrementing values of emotional value respectively for the types of emotional values.

7. The computer readable medium according to claim 5, wherein the network control unit sets an incrementing/decrementing value of emotional value in the incrementing/decrementing value holding part of a neuron on the basis of an emotional value held by the emotional value counter when the neuron is added in connection with an input vector given to the long-term memory network unit.

8. The computer readable medium according to claim 5, wherein the network control unit adds the incrementing/decrementing value of emotional value held by the incrementing/decrementing value holding part of each neuron to the emotional value held by the emotional value counter when a plurality of mutually related neurons are followed sequentially by using the pointer part of each neuron of the long-term memory network unit.

9. The computer readable medium according to claim 5, wherein the pointer part of each neuron of the long-term memory network unit holds a plurality of pieces of pointer information about mutually related other neurons; and the network control unit selects a neuron that holds an incrementing/decrementing value of emotional value similar to the emotional value held by the emotional value counter, from a plurality of neurons as candidates for chaining, when a plurality of mutually related neurons are sequentially followed by using the pointer part of each neuron of the long-term memory network unit.

10. The computer readable medium according to claim 5, wherein the network control unit sequentially retrieves neurons that make the emotional value held by the emotional value counter meet a predetermined condition.

11. The computer readable medium according to claim 10, further comprising a short-term memory network unit that partially holds a state of a comparatively highly activated neuron among the neurons of the long-term memory network unit;
wherein the network control unit determines a range of retrieval on the basis of the state of the neuron held by the short-term memory network unit, when sequentially retrieving the neurons that make the emotional value held by the emotional value counter meet a predetermined condition.

12. A computer readable memory having stored thereon a memory-chaining program for modeling memory-chaining functions of a brain using an artificial neural network structure, said program configured to make one or more processors execute the procedures of:
forming an artificial neural network structure including a plurality of neurons each having a radial-basis function main part that provides an activation intensity corresponding to similarity between an input vector and a centroid vector according to a radial-basis function, and a pointer part that holds pointer information about a mutually related other neuron;
setting pointer information in the pointer part of each neuron on the basis of order of neurons added or activated in a time series in connection with a plurality of input vectors; and
sequentially following a plurality of mutually related neurons using the pointer part of each neuron,
wherein each neuron further has an incrementing/decrementing value holding part that holds an incrementing/decrementing value of emotional value to be added to an emotional value numerically representing an intensity of emotion; and the computer is made to execute the procedure of setting an incrementing/decrementing value of emotional value in the incrementing/decrementing value holding part of a neuron on the basis of the emotional value when the neuron is added in connection with an input vector.

13. The computer readable memory according to claim 12, further adapted to make the one or more processors execute the procedure of adding, to the emotional value, the incrementing/decrementing value of emotional value held by the incrementing/decrementing value holding part of each neuron, while sequentially following a plurality of mutually related neurons by using the pointer part of each neuron.

14. The computer readable memory according to claim 12, further configured to make the one or more processors execute the procedure of sequentially retrieving neurons that make the emotional value meet a predetermined condition.

15. A computer readable medium having stored thereon a neuron element to be used in a memory-chaining system using an artificial neural network structure for modeling memory-chaining functions of a brain, said neuron element comprising:
a radial-basis function main part that provides an activation intensity corresponding to similarity between an input vector and a centroid vector according to a radial-basis function;
a pointer part that holds pointer information about a mutually related other neuron element, wherein the pointer part holds a plurality of pieces of pointer information about mutually related other neuron elements; and
an incrementing/decrementing value holding part that holds an incrementing/decrementing value of emotional value to be added to an emotional value numerically representing an intensity of emotion.

* * * * *

UNITED STATES PATENT AND TRADEMARK OFFICE
CERTIFICATE OF CORRECTION

| | | |
|---|---|---|
| PATENT NO. | : 7,747,549 B2 | Page 1 of 1 |
| APPLICATION NO. | : 10/253642 | |
| DATED | : June 29, 2010 | |
| INVENTOR(S) | : Tetsuya Hoya | |

It is certified that error appears in the above-identified patent and that said Letters Patent is hereby corrected as shown below:

ON THE TITLE PAGE:

At item (73) Assignee, change:

"Rikan, Saitama (JP)" to -- Riken, Saitama (JP) --.

Signed and Sealed this
Twenty-eighth Day of December, 2010

David J. Kappos
*Director of the United States Patent and Trademark Office*